US009273700B2

United States Patent
Bergemann et al.

(10) Patent No.: US 9,273,700 B2
(45) Date of Patent: Mar. 1, 2016

(54) PRESSURE MEDIUM SUPPLY ARRANGEMENT

(71) Applicant: WABCO GmbH, Hannover (DE)

(72) Inventors: Klaus-Dieter Bergemann, Hannover (DE); Morten Gehrke, Wennigsen (DE); Jorg Meier, Hessisch Oldendorf (DE); Jorg Scharpenberg, Langenhagen (DE)

(73) Assignee: WABCO GmbH, Hannover (DE)

( * ) Notice: Subject to any disclaimer, the term of this patent is extended or adjusted under 35 U.S.C. 154(b) by 497 days.

(21) Appl. No.: 13/829,345

(22) Filed: Mar. 14, 2013

(65) Prior Publication Data

US 2013/0255240 A1    Oct. 3, 2013

(30) Foreign Application Priority Data

Mar. 30, 2012    (DE) .................. 10 2012 006 382

(51) Int. Cl.
*B60G 17/052*    (2006.01)
*F15B 1/02*    (2006.01)
*F15B 21/04*    (2006.01)

(52) U.S. Cl.
CPC .............. *F15B 1/02* (2013.01); *B60G 17/0523* (2013.01); *F15B 21/048* (2013.01); *B60G 2500/02* (2013.01); *B60G 2500/205* (2013.01); *B60G 2500/2021* (2013.01)

(58) Field of Classification Search
CPC .......................... B60G 17/0525; F15B 21/048
USPC ......................................................... 60/410
See application file for complete search history.

(56) References Cited

U.S. PATENT DOCUMENTS

| 4,213,625 | A | * | 7/1980 | Hagen | ............. B60G 21/10 |
| | | | | | 280/43.18 |
| 6,173,974 | B1 | * | 1/2001 | Raad | ............. B60G 17/017 |
| | | | | | 280/5.514 |
| 2012/0112523 | A1 | | 5/2012 | Stoehr et al. | |

FOREIGN PATENT DOCUMENTS

| DE | 10 2005 028 328 A1 | 12/2006 | |
| DE | 10 2008 034 240 A1 | 1/2010 | |
| DE | 102008034240 A1 * | 1/2010 | ......... B60G 17/0523 |
| DE | 10 2009 008 351 A1 | 8/2010 | |
| DE | 102009008351 A1 * | 8/2010 | ............ B60T 13/263 |
| DE | 10 2010 054 710 A1 | 6/2012 | |
| DE | 10 2011 083 614 A1 | 9/2012 | |

* cited by examiner

*Primary Examiner* — Thomas E Lazo
(74) *Attorney, Agent, or Firm* — Kramer Levin Naftalis & Frankel LLP

(57) ABSTRACT

A pressure medium supply arrangement for operating a pneumatic apparatus, comprises a pressure medium supply, a pressure medium connection, a vent connection and at least one pressure medium charging connection to the pneumatic apparatus, together with a suction line, a compressor line, a vent line and at least one pressure medium charging line. A charging apparatus is configured to simultaneously direct the pressurized pressure medium applied to the pressure medium charging connection, and the further pressure medium made available in the charging apparatus by the first compressor stage of a two-stage or multistage compressor, to the second compressor stage of the compressor.

46 Claims, 10 Drawing Sheets

PRESSURE MEDIUM SUPPLY ARRANGEMENT

CROSS-REFERENCE TO RELATED APPLICATION

This application claims the benefit of DE 10 2012 006 382.2 filed on Mar. 30, 2012, the disclosure of which is hereby incorporated herein by reference in its entirety.

FIELD OF THE INVENTION

The present invention generally relates to a pressure medium supply arrangement and method for operating a pneumatic apparatus.

BACKGROUND OF THE INVENTION

A pressure medium of a pressure medium supply arrangement is generally understood to mean compressed air, but is not restricted thereto. For example, a compressed air supply arrangement is used in vehicles of all types, especially to supply an air spring of a vehicle with compressed air. Air suspension systems may also include level control devices with which the distance between vehicle axle and vehicle body can be adjusted. With increasing distance between vehicle axle and vehicle body, or ground clearance, spring travel is lengthened and even relatively large road surface irregularities can be surmounted without contact with the vehicle body. It is also desirable to implement a change of ground clearance as quickly as possible, increasing the demands with regard to speed, flexibility and reliability placed on a compressed air supply arrangement. For example, a compressed air supply arrangement is operated at a pressure level from 5 to 20 bar, and in some cases more. In particular, pressure medium can be stored in a pressure medium storage container at substantially higher pressure. The pressure medium, in particular compressed air, is made available using a compressor to a charging apparatus of the pressure medium supply. In order to supply a pneumatic apparatus, the pressure medium supply is pneumatically connected to a pressure medium connection and, in order to vent to an environment, is pneumatically connected to a vent connection, a pneumatic connection being switched by means of a vent valve.

In order to increase speed and flexibility of the pressure medium supply arrangement, a charging apparatus may be designed to operate the pressure medium supply arrangement in an open, partly closed or closed mode. Such a pressure medium supply arrangement is known from DE 10 2008 034 240 A1. This arrangement makes it possible both to convey the pressure medium from a pressure medium storage container into one or more pressure medium chambers of the pneumatic apparatus by means of the second compression stage of the compressor, and to convey the pressure medium from the atmosphere to the pressure medium storage container and/or to one or more pressure medium chambers by means of the first and second compression stages of the compressor. Automatically opening non-return valves as the outlet valve to the first compression chamber and inlet valve to the second compression chamber are arranged in the flow direction of a compressor line leading from a first compressor stage to a second compressor stage. A directional control valve in the compressor line provides that the two-stage compressor delivers practically in a circle in order to save the power of the first compression stage or to reduce the power in a predetermined manner. The pressure medium from the first compression chamber can be transferred either back to the suction chamber of the first compression stage or to atmosphere.

What is needed is an efficient operating mode of a pressure medium supply arrangement that goes beyond the foregoing and that is as fast, flexible and reliable as possible. This should apply, in particular, to an operating mode of a charging apparatus in the pressure medium supply arrangement.

SUMMARY OF THE INVENTION

Generally speaking, it is an object of the present invention to provide a pressure medium supply arrangement and method (e.g., for a vehicle lowering and/or lifting process) that yield an operating mode that is improved with regard to speed and flexibility and that is, at the same time, efficient and reliable. In particular, the pressure medium is stored efficiently and generated in a sustained manner with comparatively reduced complexity and cost; and is, nevertheless, generated and made available quickly.

The pressure medium supply arrangement comprises a pressure medium supply, a pressure medium connection and at least one pressure medium charging connection to a pneumatic apparatus, together with a suction line, a compressor line, a vent line and at least one pressure medium charging line.

Although the operation of a charging apparatus can, in principle, be managed economically, as is conventionally proposed, such operation can nevertheless be exploited in an improved manner. The inventive embodiments are based on the recognition that a concept for sustained delivery of a pressure medium by the charging apparatus, while also taking account of pressure medium storage, leads to an improved configuration of the charging apparatus in the pressure medium supply arrangement. Furthermore, in accordance with embodiments of the present invention, the charging apparatus of the pressure medium supply arrangement has an improved manner of connection to the periphery, in particular to the pneumatic apparatus; preferably, the charging apparatus has an improved manner of connection to a pressure medium storage container, such as an accumulator, and/or to a number of pressure medium chambers, for example a number of bellows. The charging apparatus can simultaneously direct a pressurized pressure medium applied to the pressure medium charging connection, and the further pressure medium made available by the first compressor stage, to the second compressor stage.

According to embodiments of the present invention, to surpass the operating mode conventionally assumed to be economical, the charging apparatus is configured to be operated with improved utilization of the load on the first and second compressor stages. For this purpose, the charging apparatus can, in particular, make available the pressure medium from the first compressor stage and further compress it in the second compressor stage in order to make it available to the pressure medium supply; an operation under load of the first compressor stage is to be utilized as effectively as possible. A sustained operating mode that benefits an exclusively economical mode of operation is thereby placed in the foreground. Furthermore, the charging apparatus can be operated using the pressurized pressure medium applied to the pressure medium charging connection—in particular from a pressure medium storage container and/or a pressure medium chamber—while further compressing the medium in the second compressor stage. The further pressure medium made available by the first compressor stage is also conducted to the second compressor stage.

The further pressure medium additionally made available in this way by the first compressor stage can be utilized, for example, to increase in a sustained manner the speed and flexibility of a pneumatic system. Because the pressure medium additionally made available is stored in a pressure medium storage container, it can be utilized, for example, to regenerate in an appropriate manner the pressure medium supply arrangement, in particular to regenerate a dryer in a main pneumatic line. This is advantageous for a lowering process of a vehicle air suspension system, and/or a lifting process of the air suspension system, which is effected by means of the pneumatic apparatus.

A control and regulating device in accordance with embodiments of the present invention is configured to activate and operate a pneumatic system according to inventive process steps. For this purpose, the control and regulating device may be provided with software and/or hardware modules designed to execute such steps.

According to one embodiment, the charging apparatus comprises a two-stage or multistage compressor connected on the pressure medium supply side to the pressure medium supply. The two-stage or multistage compressor comprises at least a first and a second compressor stage. In particular, an outlet of the second or last compressor stage is connected on the pressure medium supply side to the pressure medium supply.

The vent line between the pressure medium connection and the vent connection includes a vent valve and leads in its continuation to the vent connection to the environment. The vent connection can be formed separately from a suction connection. Alternatively, the vent connection can coincide with a suction connection of the suction line. The suction line runs, on the suction side of the compressor, between the suction connection to the environment and the compressor, in particular between a suction connection to the environment and the inlet of the first compressor stage. In the case where the suction connection coincides with the vent connection, a part of the suction line can coincide with a part of the vent line and can be used jointly therewith. In particular, for this purpose, the vent line can lead to the suction line upstream of a suction and vent connection.

The compressor line runs between the first and second compressor stages, in particular between the outlet of the first compressor stage and the inlet of the second compressor stage. Advantageously, the compressor line is configured simultaneously to conduct the pressurized pressure medium and the further pressure medium to the second compressor stage. In particular, the compressor line is advantageously configured to conduct the pressurized pressure medium and the further pressure medium to the compressor stage free of retaining pressure (retaining pressure should be understood to mean a defined additional retaining pressure, for example a retaining pressure as utilized to ensure idling operation of the first compressor stage). That is, according to embodiments of the present invention, the compressor line is free of a defined additional retaining pressure, for example a retaining pressure of a pneumatic blocking or switching means. A blocking means should be understood to mean, for example, a non-return valve; a switching means should be understood to mean, for example, a directional control valve.

The vent valve is connected to a valve connection in the vent line. A pressure medium made available to the pressure medium supply can be applied to the pneumatic apparatus via the main pneumatic line between the pressure medium supply and the pressure medium connection.

The main pneumatic line includes a dryer. In order to ensure long-term operation of the pressure medium supply arrangement, the pressure medium, in particular compressed air, must be dried, since it is regularly charged with moisture. An accumulation of moisture in the pneumatic system is thereby avoided, which accumulation could otherwise lead at low temperatures to valve-damaging crystal formation and, furthermore, to undesired defects in the compressed air supply arrangement and in the pneumatic apparatus. A dryer, in particular an air dryer, includes a drying agent, usually a granulate packing through which the compressed air can flow, so that the granulate packing can take up by adsorption—under comparatively high pressure—moisture contained in the compressed air. An air dryer may optionally be designed as a regenerative air dryer. This can be effected in that the dried air from the air suspension system is made to flow through the granulate packing upon each venting cycle, under comparatively low pressure, in countercurrent or co-current flow relative to the charging direction. For this purpose, the vent valve arrangement may be opened. Generally speaking, the present invention can be advantageous for such a use, which is also referred to as pressure change adsorption; in this way, in particular, a compressed air supply can be designed to be flexible and at the same time reliable; in particular, comparatively rapid venting is possible with a pressure change that is nevertheless sufficient for regeneration of the air dryer.

Furthermore, the inventive embodiments also make it possible to execute charging of the pneumatic apparatus as effectively as possible, in particular while likewise taking account of the regenerative capability of the air dryer. This is also advantageous in the event that charging takes place in a comparatively short time and with a comparatively high pressure amplitude. This is especially applicable in the present case of a pressure medium supply arrangement with a two-stage or multistage compressor, which can also be operated in so-called boost mode. A boost mode should be understood generally to mean an operation of the pressure medium supply arrangement in which the pressurized pressure medium—whether from a pressure medium storage container and/or from a pressure medium chamber—and a further pressure medium from a compressor are redistributed. This may concern, above all, a lifting process in which the pressure medium from a pressure medium storage container enters a pressure medium chamber through the pressure medium connection via the compressor while the compressor is being operated. However, this may also concern a lowering process in which the pressure medium from a pressure medium chamber enters a pressure medium storage container through the pressure medium connection via the compressor while the compressor is being operated Accordingly, the pressure medium supply arrangement can have at least one pressure medium charging connection to the pneumatic apparatus. In particular, a pressure medium storage container and/or a number of pressure medium chambers of the pneumatic apparatus can be connected to the pressure medium charging connection, for example via at least one charging branch line.

The pneumatic apparatus preferably has a gallery and at least one branch line connected pneumatically to the gallery with a pressure medium chamber—in particular a bellows—and a pressure medium storage container, in particular a pressure accumulator. One or more, or all, branch lines advantageously include a respective directional control valve. In the following exposition, in the case of a pressure medium chamber reference is also made to a bellows, and in the case of a pressure medium storage container reference is also made to a pressure accumulator or reservoir, which is not meant to be restrictive with respect to what may be understood generally by a pressure medium chamber or a pressure medium storage container. Preferably, a branch line in the form of an accumulator line has an accumulator valve arranged upstream of the pressure accumulator, and/or a branch line in the form of a bellows line has a bellows valve arranged upstream of the bellows. In this way, the opening and closing processes of the directional control valves required for the lifting and lowering processes of the suspension system can be implemented individually or in combination for each bellows or pressure accumulator.

Preferably, a pressure sensor by means of which preferred pressure amplitudes can be monitored is provided in the pneumatic apparatus. The pressure sensor may be installed at different points. In particular, the pressure sensor can be connected directly to a pressure accumulator and/or to an accumulator line or other pneumatic connecting line to a pressure medium storage container. A pressure sensor may also be connected to a gallery additionally or alternatively to the pressure sensor associated with the pressure accumulator. A further pressure sensor may also be advantageously connected to a bellows line and/or directly to a bellows, in order, additionally or alternatively, to monitor the pressure level of the pressure medium chamber. The values of one or more pressure sensors may be used not only for monitoring purposes but also for control and regulation purposes, such as of the pressure medium supply arrangement and, in particular, of the charging apparatus, preferably of individual components thereof, namely, of a motor of the compressor, and/or for controlling and regulating at least one charging valve and/or a nominal-width adjustable throttle of the charging apparatus.

At least one pressure medium charging line is provided between the pressure medium charging connection and the compressor line. Preferably, a first pressure medium charging line is provided between the first pressure medium charging connection and the inlet of the second compressor stage. Additionally or alternatively, a second pressure medium charging line can be provided between the second pressure medium charging connection and the inlet of the second compressor stage.

The pressure medium charging line and the compressor line are preferably configured to supply the pressurized pressure medium from the pressure medium charging connection to the second compressor stage, in order to supply this pressurized pressure medium, further compressed, to the pneumatic apparatus via the main pneumatic line between the pressure medium supply and the pressure medium connection. Preferably, the pressure medium from the pressure medium storage container is supplied, via a first pressure medium charging connection to the second compressor stage, to a number of pressure medium chambers. Additionally or alternatively, the pressure medium can be conducted from the number of pressure medium chambers via a second pressure medium charging connection and via the second compressor stage to the pressure medium storage container. As a result, with efficient utilization of the charging apparatus, the pressure medium can be conducted back and forth between a pressure medium chamber and a pressure medium storage container of the pneumatic apparatus in order to implement a lifting process or a lowering process for a vehicle.

Advantageously, the suction line and the compressor line are configured to make available the further pressure medium from the suction connection via the first compressor stage and to supply the further pressure medium to the second compressor stage in order to be able to supply it, further compressed, to the pneumatic apparatus via the main pneumatic line between the pressure medium supply and the pressure medium connection. Thus, especially in the context of the above embodiments, the simultaneous supply, in combination, of pressurized pressure medium applied to the pressure medium connection, and of further pressure medium made available by the first compressor stage, to the second compressor stage, is provided. In particular, the supply can be formed free of a retaining pressure acting in the counter-supply direction—as is deliberately provided in the prior art, for example by a non-return valve or other blocking means, or by a directional control valve or other control means. This is advantageously conducive to complete utilization of the pumping power of at least a first and second compressor stage of a two-stage or multistage compressor. Especially in the context of the above embodiments, it is far more effective to utilize the compressor entirely for its pumping power and, instead, to store the pressure medium in a flexible and quickly available manner, for example in the pressure medium storage container and/or in the pressure chambers, and/or by using the simultaneous back-and-forth storage possibility free of retaining pressure, as explained. In principle, a boost mode is therefore available far more often as an operating option, through the availability of a sufficient quantity of the pressure medium. Advantageously, a boost mode does not need to be ended in a specified manner on account of a diminishing or actually insufficient accumulator pressure; such a measure is bound up with considerable outlay in measurement technology. Rather, as a result of the further pressure medium made available, and in particular additionally supplied, from a first compressor stage in addition to a pressurized pressure medium, a required pressure medium flow can be extensively maintained even for a boost mode, or at any rate a reduction of the pressure medium flow can be effectively counteracted in a large proportion of operating cases.

Preferably, for a lowering process effected by means of the pneumatic apparatus, the pressure medium supply arrangement is operated selectively open, partly closed or closed. An open mode can be carried out while discharging the pressure medium, especially directly, that is, via the pressure medium connection and the main pneumatic line, optionally with regeneration of the air dryer, to the vent connection. A closed mode can be carried out while discharging the pressure medium from a pressure medium chamber to the pressure medium storage container via the compressor, the pressurized pressure medium applied to the pressure medium charging connection being conducted, together with the further pressure medium made available by the first compressor stage, in the conducting direction to the second compressor stage. A partly closed mode can be carried out with the participation of both the foregoing operating modes, successively in any sequence or at least intermittently simultaneously. In particular, a partly closed mode is carried out while discharging the pressure medium from a pressure medium chamber to the vent connection and from a pressure medium chamber to the pressure medium storage container, in any sequence successively or at least intermittently simultaneously.

Additionally or alternatively, a lifting process can be effected by means of the pneumatic apparatus to operate the pressure medium supply arrangement selectively open, partly closed or closed. In particular, the pressure medium may be conveyed to the pressure medium connection for this purpose. This may take place outside a boost mode while operating the first and second compressor stages, that is, while utilizing the further pressure medium. In the open mode, the pressure medium is conveyed from the atmosphere to the pressure medium connection via the compressor. In the closed mode, this may be carried out while discharging the pressure medium from a pressure medium storage container to a pressure medium chamber via a gallery. A partly closed mode may be carried out with the participation of both the foregoing operating modes in any sequence successively or at least intermittently simultaneously. In particular, this may be carried out while conducting the pressurized pressure medium applied to the pressure medium charging connection from the pressure medium storage container or from a pressure medium chamber, and the further pressure medium made available by the first compressor stage, in the conducting direction to the second compressor stage successively or at least intermittently simultaneously.

Stated briefly, in a partly closed lowering process, the pressure medium is transferred from a pressure medium chamber to a pressure medium storage container by means of the compressor and, in particular, the pressure medium is additionally transferred by means of at least one compressor stage of the compressor, in particular the first compressor stage, from the atmosphere to the pressure medium storage container. In a partly closed lifting process, the pressure medium is transferred from a pressure medium storage container to a pressure medium chamber by means of the compressor and, in particular, the pressure medium is additionally transferred by means of at least one compressor stage of the compressor, in particular the first compressor stage, from the atmosphere to a pressure medium chamber. Advantageously, in the context of a partly closed lifting process and/or lowering process, a venting process to the vent connection can be carried out while regenerating a dryer in the main pneumatic line. As a result, a pressure volume of the compressed air of the pneumatic apparatus is nevertheless even then identical or practically the same as prior to a lifting process and/or lowering process.

Operation of the pressure medium supply arrangement can be optimized while equalizing the pressure levels that are present in at least one charging branch line in comparison to a compressor line. In particular, pneumatic means may be provided in at least one pressure medium charging line of the pressure medium supply arrangement in order to take account of the different pressure level between an outlet of the first compressor stage on the one hand and a pressure medium storage container or a pressure medium chamber on the other.

Thus, a first pressure medium charging line between a first pressure medium charging connection and the compressor line contains a first throttle, and/or a second pressure medium charging line between a second pressure medium charging connection and the compressor line contains a second throttle. Preferably, the first throttle and/or the second throttle has a nominal width configured to effect a pressure reduction in the first and/or second pressure medium charging line as compared to the compressor line. In this way, the higher pressure levels of a pressure medium storage container or of a pressure medium chamber can be throttled to the pressure level in a compressor line, in particular to a pressure level at the outlet of the first compressor stage and/or at the inlet of the second compressor stage. During operation of the second compressor stage, this has the advantage, inter cilia, that as a result of the reduction of the pressure in the pressure medium storage container or in at least one of the pressure medium chambers, a current consumption is kept within limits. In this development, the sustained generation and storage of the pressure medium, with efficient operation of both or all compressor stages, is combined with economical operation of the compressor. This also supports a comparatively economical operation of the first compressor stage, while the delivery rate of a first compressor stage is nevertheless utilized efficiently, instead of dispensing therewith. In addition, a boost mode becomes possible without loss of the pressure medium in the pressure medium supply arrangement, or at any rate with small losses, and therefore is possible more frequently.

For example, a nominal width of the first and/or second throttle is preferably configured to effect a pressure drop with an amplitude from one-third to one-half of the pressure in the first and/or second pressure medium charging line to the inlet of the second or further compressor stage of the compressor. In particular, an amplitude in the range from 8 to 10 bar is desirable with regard to an advantageous pressure medium supply arrangement and an advantageous pneumatic system. In particular, the pressure drop may be effected from a range of 15-25 bar to a range of 5-15 bar, in particular in a manner regulated or unregulated by means of a nominal width of a first and/or second throttle. Specifically, a nominal width in the range from 0.5 to 1.5 mm, in particular in the range from 0.6 to 0.8 mm is advantageous. Nominal widths between these values, for example in the range from 0.6 to 1.2 mm, are also advantageous. The nominal width may be fixed or adjustable. In particular, an adjustable nominal width is desirable, since, in this case, a nominal width adaptation can take place, for example as a function of the pressure in the first and/or second pressure medium charging line or of a control signal. The pressure in the pressure medium charging line can advantageously be measured at and/or between a pressure medium charging connection and a throttle, but this may also take place at or between a pressure medium charging connection and a pressure medium storage container and/or a pressure medium chamber. An adjustable nominal width may also be effected as a function of an increase in output of the compressor, in particular of a motor of the compressor. This and other nominal-width control or regulation measures can make possible a largely uniform—concretely, uniformly loaded—operation of the compressor, that is, in particular, with uniform current consumption within a preferred current or power output range. This supports the efficient and therefore sustained and life-prolonging operation of the compressor.

In principle, the control of the pressurized pressure medium acting on the pressure medium charging connection may be effected with suitable pneumatic control. In particular, a first charging valve can be connected to a first pressure medium connection and/or a second charging valve to a second pressure medium connection. A charging valve, in particular in the form of a directional control valve, preferably in the form of a directional control valve that is switchable to two switching states, such as a 2/2-way valve, is advantageous. A charging valve may be provided in the pressure medium supply arrangement and/or in the pneumatic apparatus. For example, a first pressure medium charging line of the pressure medium supply arrangement may include a first charging valve between a first pressure medium charging connection and the compressor line, and/or a second pressure medium charging line may include a second charging valve between a second pressure medium charging connection and the compressor line. Additionally or alternatively, a first charging valve can be connected to a first pressure medium charging line between a first pressure medium charging connection and a pressure medium storage container in the pneumatic apparatus, or between the pressure medium supply arrangement and the pneumatic apparatus; and a second charging valve may be connected to a second pressure medium charging line between a second pressure medium charging connection and at least one pressure medium chamber in the pneumatic apparatus, or may be connected between the pressure medium supply arrangement and the pneumatic apparatus.

By opening or closing a charging valve, therefore, the stored pressure medium, which can be charged as required into the second compressor stage, can be withdrawn from the pressure medium storage container and/or the pressure medium chamber. This pressurized pressure medium, acting on at least one pressure medium connection, may be conducted to the second compressor stage simultaneously with the further pressure medium made available by the first compressor stage. In principle, this is advantageous both for a vehicle lifting process and for a lowering process, at any rate in the closed or partly closed mode of the pressure medium supply arrangement; the foregoing operating modes may take place singly or in any time-combination with an open operating mode, in particular venting to atmosphere or to a vent connection.

Separation of the pressure medium storage container and a number of pressure medium chambers is advantageous in conducting the pressurized pressure medium. In particular, an isolating valve may be provided in the pneumatic apparatus in order to separate the pressure medium storage container and pressure medium chambers.

The switching of a vent valve can, in principle, be effected according to demand and in different ways; for example, a single directly switchable vent valve, and also a vent valve arrangement with a vent valve, may be provided in the vent line. A solenoid valve arrangement having a control valve for controlling the vent valve is advantageous. A main pneumatic line containing an unblockable non-return valve, which can be unblocked by means of the control valve, is also advantageous. The control valve may be configured to control the vent valve and to unblock the unblockable non-return valve. In this way, the dryer can be opened on both sides by means of a single control valve, the non-return valve being unblocked and the vent valve being opened. This is conducive to rapid charging of the pneumatic apparatus and to complete regeneration of the dryer. In particular, it is advantageous that the control valve be connected to a valve connection in a pneumatic control line connected to a pressure control connection of the vent valve. The vent valve is configured to maintain a pressure control connection under control pressure, with the valve connection of the vent valve in the vent line open and with the non-return valve unblocked. Preferably, the control valve can have two valve connections, which are connected to the control line, the control valve being in the form of a 3/2-way valve having a valve connection to the environment and the control line branching off from the main pneumatic line.

The directional control valves of the pneumatic apparatus can advantageously be organized, together with the isolating valve, in one or more valve blocks. A compact valve block formation, including the isolating valve, is advantageous. In particular, a compact valve block structure, which is known per se, can be utilized without further manufacturing outlay.

According to a preferred exemplary embodiment (see FIG. 1), a charging branch line is connected directly to a pressure medium storage container and leads to a first pressure medium charging connection, which connects the charging branch line to a pressure medium charging line leading to the compressor line of the pressure medium supply arrangement.

According to another exemplary embodiment (see FIG. 2), a charging branch line is configured as a connecting line to a gallery of the pneumatic apparatus and leads to a second pressure medium charging connection, which connects the charging branch line to a second pressure medium charging line of the pressure medium supply arrangement and via this line to the compressor line. The second charging valve in the pneumatic apparatus is preferably connected into this connecting line to the gallery. In principle, however, the second charging valve may also be arranged in the second pressure medium charging line of the pressure medium supply arrangement, especially as a part of the charging apparatus.

In a further exemplary embodiment (see FIG. 3), the charging branch line may again be provided as a connecting line to the gallery, a first charging valve being provided in the first pressure medium charging line between the first pressure medium charging connection and the compressor line. This makes possible a comparatively compact structure. In contrast, the exemplary embodiment depicted in FIG. 2 makes possible the advantageous use of existing valve blocks while forming a first storage gallery and a second spring gallery in separate valve blocks.

In yet another exemplary embodiment (see FIG. 4), the teachings of the embodiments depicted in FIGS. 1 and 2, on the one hand, and of the embodiment depicted in FIG. 3, on the other hand, may be combined with one another, in that a first charging branch line branching from an accumulator line leads to a first pressure medium connection and a second charging branch line branching from a gallery leads to a second pressure medium connection. In this case, a first and a second pressure medium charging line with a first and second pressure medium connection of the pressure medium supply arrangement are provided. FIG. 4 also shows the arrangement of a first charging valve in the first pressure medium charging line and of a second charging valve in the second charging branch line. In principle, variants of the arrangement of the charging valves may also be provided. For example, the first charging valve may be arranged in the first charging branch line and the second charging valve may be arranged in the second pressure medium charging line of the pressure medium supply arrangement. It is also possible to arrange the first and second charging valves, respectively, in the first and second charging branch lines, or to arrange the first and second charging valves, respectively, in the first and second pressure medium charging lines of the pressure medium supply arrangement. It should be appreciated that the variants of the arrangement of the charging valves also apply analogously to the aforementioned arrangement of the first and second throttles. In particular, a first throttle can be implemented as a part of the first charging valve and/or a second throttle can be implemented as a part of the second charging valve. Upon energization of a charging valve, a throttle may be active in a switched-on, that is, energized open, state of the charging valve. In this case, a throttle is integrated in the energized open state of the charging valve.

It should be understood that, although the charging valves discussed herein are described as currentlessly closed directional control valves and the bellows and accumulator valves discussed herein are described as currentlessly closed directional control valves, the directional control valves may nevertheless also be implemented as currentlessly open directional control valves, so that energization thereof is coordinated with their functionality.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts, which are adapted to effect such steps, all as exemplified in the following detailed disclosure, and the scope of the invention will be indicated in the claims.

BRIEF DESCRIPTION OF THE DRAWINGS

For a fuller understanding of the inventive embodiments, reference is had to the following description taken in connection with the accompanying drawings in which.

LIST OF REFERENCE NUMBERS

Figure 1:
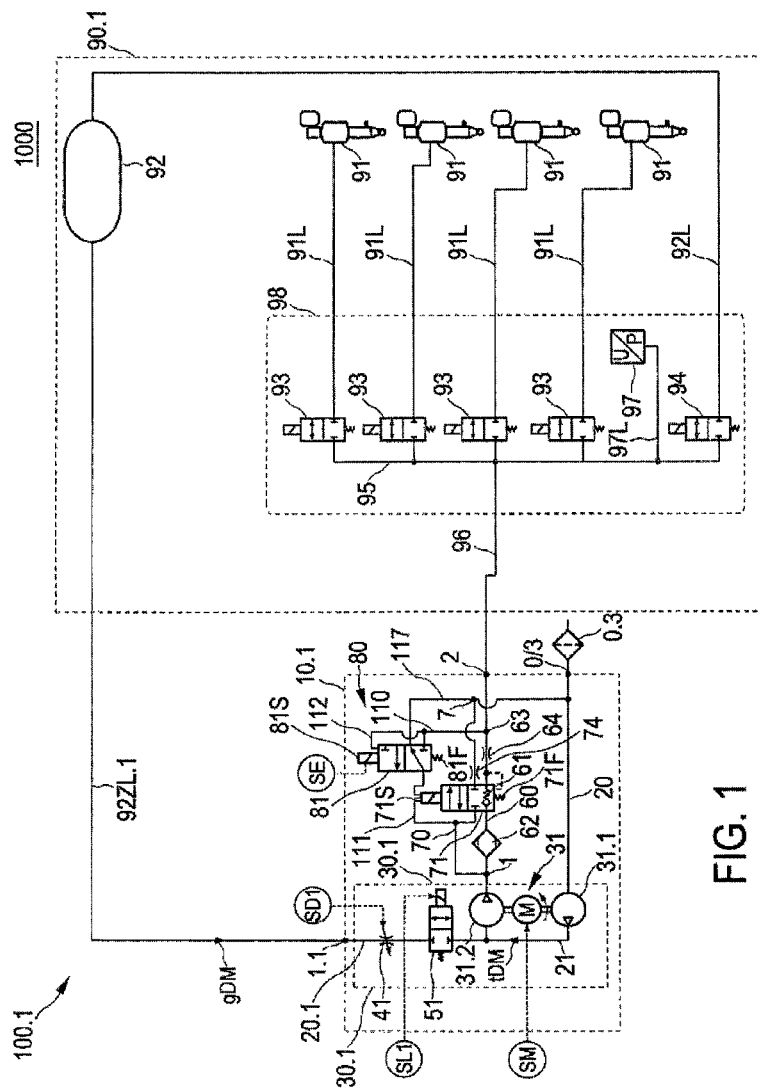
FIG. 1 is a diagram of a first embodiment of a pneumatic system with pressure medium supply arrangement and pneumatic apparatus according to the present invention.

0 Suction connection
0.3 Filter
1 Pressure medium supply
1.1, 1.2 First, second pressure medium charging connection
2 Pressure medium connection
3 Vent connection
7 Branch connection
10.1, 10.2, 10.3, 10.4 Compressed air supply arrangement
20 Suction line
20.1, 20.2 First, second pressure medium charging line
21 Compressor line
30.1, 30.2, 30.3, 30.4 Charging apparatuses
31 Compressor
31.1, 31.2 First, second compressor stage
41, 42 First, second nominal-width adjustable throttle
43, 44 First, second fixed nominal width throttle
51, 52 First, second charging valve
60 Main pneumatic line
61 Non-return valve
62 Air dryer
64 Regeneration throttle
70 Vent line
71 Vent valve
71S Control connection of vent valve
74 Venting throttle
80 Solenoid valve arrangement
81 Control valve
90 Pneumatic apparatus
91 Bellows
91L Bellows line
92 Accumulator
92L Accumulator line
92ZL.1, 92ZL.2 Charging branch line
93 Bellows valve
94 Accumulator valve
95, 95.1, 95.2 Galleries
96, 96.1, 96.2, 96.3 Pneumatic connecting lines
97 Pressure sensor
97L Pressure sensor line
98.1 First valve block
98.2 Second valve block
99 Isolating valve
100.1, 100.2, 100.3, 100.4 Pneumatic system
110, 111, 112, 117 Control line, pneumatic line
gDM Pressurized pressure medium
tDM Further pressure medium
BA1, BA2, BA3 Lowering process variants, operating mode BA open, closed, partly closed
A1 Open lowering process
A2 Closed lowering process
A3 Partly closed lowering process
A3.1, A3.2 Sections of lowering process
F1-HA Shallow flank of rear axle
F2-HA Steep flank of rear axle
VA, HA Front axle, rear axle
BH1, BH2, BH3 Lifting process variants, operating mode BA open, closed, partly closed
HI Open (compressor) lifting process
H2 Closed (accumulator) lifting process
H3 Partly closed (charging) lifting process
H3.1, H3.2 Sections of lifting process
M Motor
N Level signal
P Plateau
RD Reservoir pressure, accumulator pressure
RD1, RD2 Pressure
S Pneumatic control module
SA Process steps
SD1, SL1, SL2, SM, SE, ST Control signals
t1 . . . t9 Times
T Period

DETAILED DESCRIPTION OF THE PREFERRED EMBODIMENTS

Referring now to the drawing figures, FIG. 1 shows a pneumatic system 100.1 comprising a compressed air supply arrangement 10.1 and a pneumatic apparatus 90.1, in the form of an air suspension system for a vehicle 1000 (not further illustrated) having a front axle VA and a rear axle HA. A vehicle control unit ECU and a data bus such as, for example, a CAN bus or the like may be provided in the vehicle 1000. In particular, suitable control signals transmitted by the control unit and data bus—in particular control currents for energizing magnet coils of the electrically controllable valves of the pneumatic system 100.1 or a motor M of a compressor 31—may be made available. The signals are shown individually, as far as practical, by dot-dash lines in FIG. 1, FIG. 2 and FIG. 3, and in more detail in FIG. 4 with the vehicle control unit ECU. In order to implement a suspension or level change of a vehicle body—having, for example, the front axle VA and the rear axle HA—the pneumatic apparatus 90.1 shown has a total of four bellows 91, each bellows 91 forming a part of an air spring (not specifically denoted). A bellows valve 93 in the form of a directional control valve—in this case, an actuatable 2/2-way solenoid valve—is in each case connected upstream of a respective bellows 91 in a bellows line 91L. The bellows lines 91L each branch in the form of a branch line from a gallery 95 forming a collecting line, which in turn is connected to a further pneumatic connecting line 96. The further pneumatic connecting line 96 adjoins the pressure medium connection—also referred to as the compressed air connection 2—of the compressed air supply arrangement 10.1. In general, the pressure medium is referred to in an exemplary manner as compressed air in the present example, without this being restrictive regarding the selection of a different pressure medium.

The pneumatic apparatus 90.1 also comprises a pressure accumulator 92 connected to the gallery 95 via an accumulator line 92L, upstream of which an accumulator valve 94, here, in the form of a controllable 2/2-way solenoid valve, is connected. In the present case, a pressure sensor 97 is connected to the gallery 95 via a pressure sensor line 97L, which pressure sensor 97 is suitable for measuring an accumulator pressure in the accumulator 92 as well as a bellows pressure in the bellows 91 by means of a voltage/pressure conversion u/p. For this purpose only the accumulator valve 94, for example, or only a bellows valve 93 is opened. All the 2/2-way solenoid valves, namely the four bellows valves 93 and the one accumulator valve 94, are combined into a single 5-fold valve block 98 as a constructional unit in the present example.

Via the compressed air connection 2 and the main pneumatic line 60, connected thereto, of the compressed air supply arrangement 10.1 and the further pneumatic connecting line 96, the bellows 91 and the accumulator 92 can be charged via the gallery 95 or vented in the opposite direction.

The compressed air supply arrangement 10.1 comprises, with regard to individual components, a suction line 20 to a charging apparatus 30.1, which suction line 20 runs between a suction connection 0 to the environment and a compressor 31 of the charging apparatus; specifically, in the present example, it runs between a filter element 0.3 upstream of a suction connection 0 and an inlet of a first compressor stage 31.1 of the compressor 31. The compressor 31 comprises the first compressor stage 31.1 and a second compressor stage 31.2, and a motor M for driving same; that is, the motor M drives one or more compressor pistons which move/s in a compressor chamber (not denoted individually) of a compressor stage while compressing the pressure medium, that is, air in the present example, in the first compressor stage, the air thus partially compressed then being further compressed as compressed air in the second compressor stage.

An outlet of the first compressor stage 31.1 is adjoined by a compressor line 21 between the first compressor stage 31.1 and the second compressor stage 31.2, that is, between the outlet of the first compressor stage 31.1 and the inlet of the second compressor stage 31.2. On the pressure medium supply side, the compressor 31 is connected by the outlet of the second compressor stage 31.2 to a pressure medium supply 1 via which the pressure medium can be supplied to a main pneumatic line 60 and can be made available at the pressure medium connection 2. The pressure medium is conducted via a dryer 62 for the pressure medium, normally compressed air in the present case, arranged in the main pneumatic line 60. A vent line 70, which leads via a vent valve 71 to the vent connection 3, also connects directly to the compressed air supply 1 between the compressed air supply 1 and the compressed air connection 2. The vent valve 71 forms part of a solenoid valve arrangement 80, which also includes a control valve 81 in the form of a directional control solenoid valve and, in the present case, an unblockable non-return valve 61. In the present case, the unblockable non-return valve 61 and the vent valve 71 are actuatable by means of a single control piston, which is movable as a relay piston via a pressure control connection 71S. A suitable control pressure can be supplied to the pressure control connection 71S via the control valve 81. In the present case, the control pressure is a control pressure that is switched via the control valve 81 and branched from the main pneumatic line 60 into a control line at the branch connection 63. The control valve 81 is shown in the form of a 3/2-way valve. In the currentless state shown in FIG. 1, the control line 110 is formed with a first part and a second part, which are separated pneumatically by the control valve 81. The first part starts from the branch connections 63; the second part leads to the pressure control connection 71S. In the form shown with respect to the control line 110, the 3/2-way valve is in a currentless state, which pneumatically separates the aforementioned first and second parts. The second part is also vented to a further vent line 117, the further vent line 117 being brought together with the vent line 70 at a branch connection 7; both vent lines 117 and 70 are continued as a common vent line 70 to the vent connection 3 and in the last part are identical with a part of the suction line 20.

A first further control line 111 and a second further control line 112 lead directly to the piston of the vent valve 71 and to the piston of the control valve 81 and branch, respectively, from the vent line 70 and the control line 110. This results in more rapid switching activity in the case of venting; that is, when the control valve 81, with corresponding energization of the magnet coil, moves at an accelerated rate to the second energized switching state, the relay piston of the vent valve 71 is already preloaded against the spring force of the valve spring 71F and 81F. If the control piston 71S of the vent valve is moved, the vent valve 71 is transferred to the actuated open state and, at the same time, the non-return valve 61 is pneumatically unblocked. As a result, the air dryer 62 provided in the main pneumatic line 60 is opened on both sides, on the side of the vent line 70 and on the side of the compressed air connection 2.

Venting of the pneumatic apparatus 90 is effected via a first throttle, here the regeneration throttle 64 in the main pneumatic line 60, and a second throttle, here the venting throttle 74 in the vent line 70. In the present exemplary embodiment, a nominal width of the regeneration throttle 64 is larger than a nominal width of the venting throttle 74, in order to make possible efficient venting while avoiding an excessive sound or pressure amplitude, and to achieve the best possible regeneration of the air dryer 62.

Figure 2:
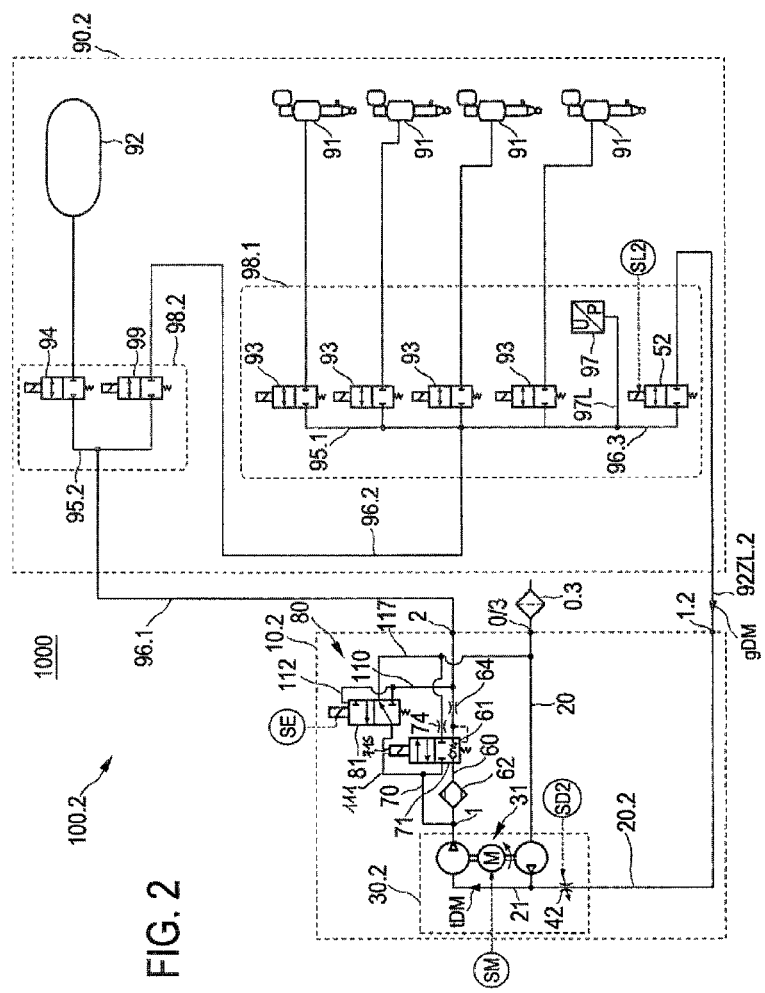
FIG. 2 is a diagram of a second embodiment of a pneumatic system of a pressure medium supply arrangement and a pneumatic apparatus.
Figure 3:
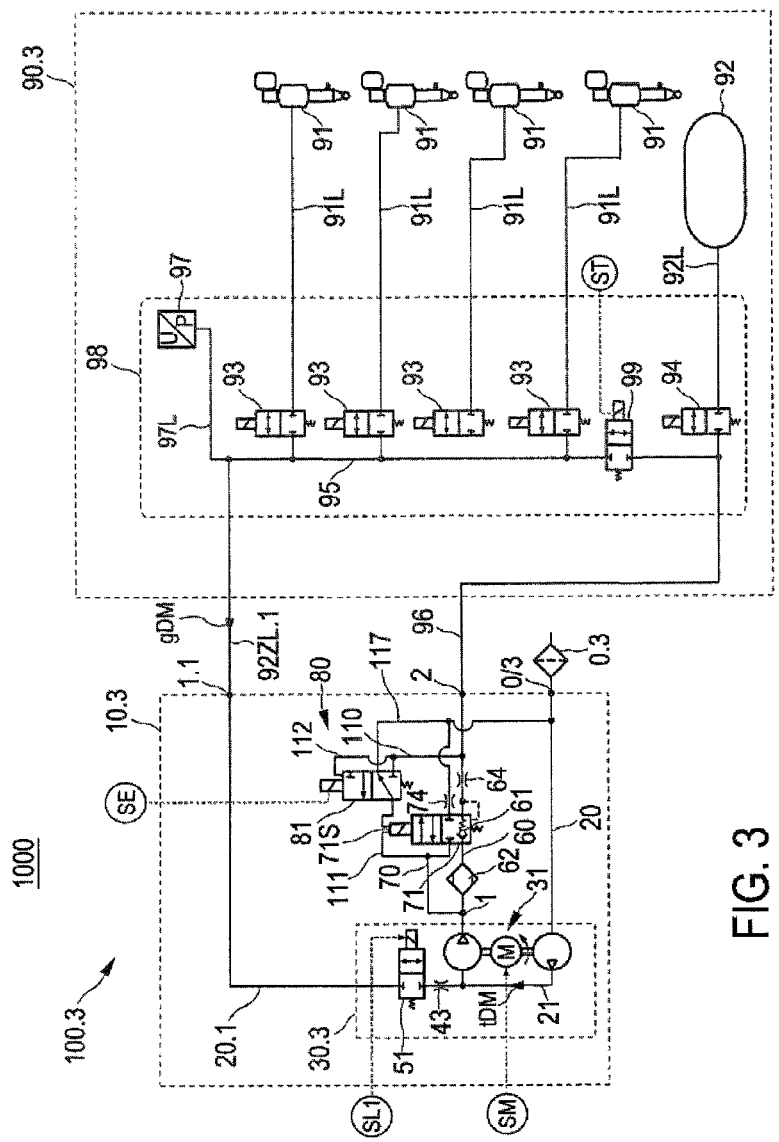
FIG. 3 is a diagram of a third embodiment of a pneumatic system of a pressure medium supply arrangement and a pneumatic apparatus.
Figure 4:
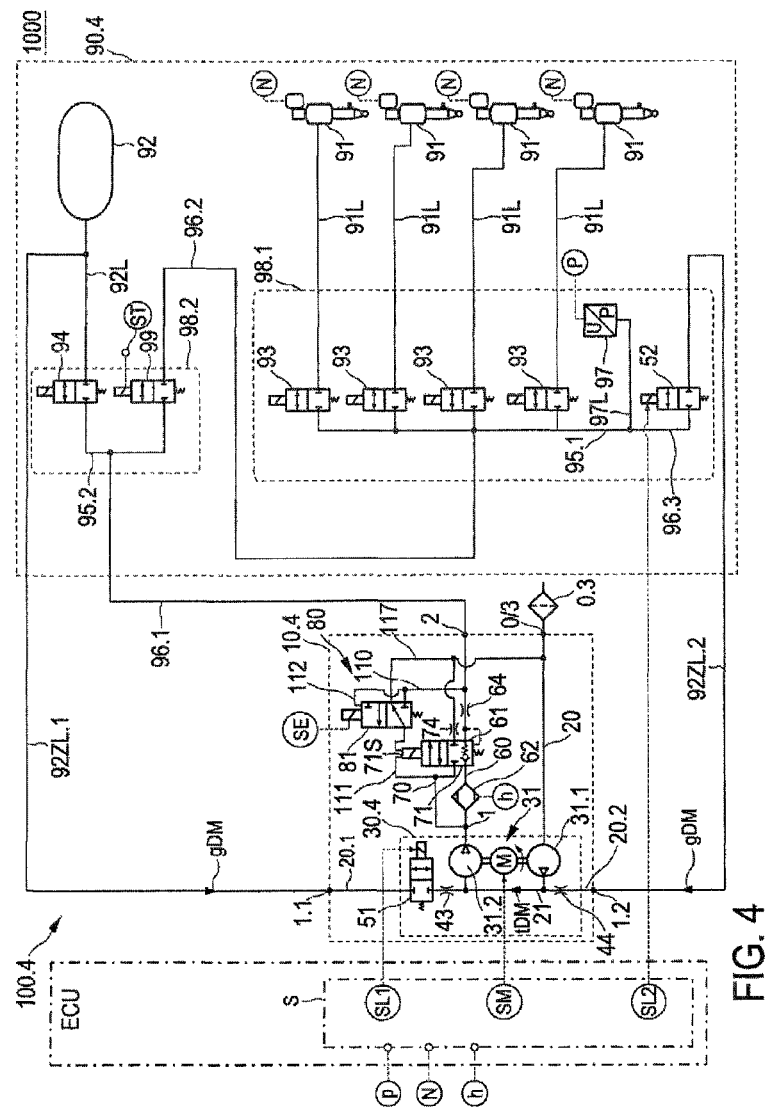
FIG. 4 is a diagram of a fourth embodiment of a pneumatic system comprising pressure medium supply arrangement and pneumatic apparatus.

The basic configuration of the above-described venting-relevant functionality of the compressed air supply arrangement 10.1, or of the main pneumatic line 60 and the suction line 20, is the same for the exemplary embodiments of FIG. 1 to FIG. 4. In particular, the above description of this part and the description of the essential parts of the pneumatic apparatus 90.1 are the same for all figures. This also applies to the reference symbols, which, in FIG. 2, FIG. 3 and FIG. 4, are marked only in part for reasons of clarity, but are the same for identical or similar parts or parts having identical or similar functions, so that, with regard to details, reference is made to the above description in relation to all figures, FIG. 1 to FIG. 4. It should, however, be understood that the solenoid valve arrangement 80 serving as the vent valve arrangement may also be implemented in modified form. In particular, in the vent line 70, instead of the pneumatically pilot-controlled vent valve 71 shown here, a separate valve directly activated via a magnet coil may be provided as the vent valve, which can be directly activated via a control current, so that the control valve 81 may be omitted; this modification of a vent valve arrangement is also referred to as a directly venting valve arrangement. In another modification, the vent valve arrangement may be formed as a so-called fast-venting valve arrangement in which, in a manner deviating from the embodiment shown here, pneumatic pilot control lines branch from the main pneumatic line 60, providing pneumatically pilot-controlled and accelerated switching activity of a vent valve.

In the following exposition, reference is made to the particular configuration of the charging apparatus 30.1, which differs from the other charging apparatuses 30.2, 30.3, 30.4 of FIG. 2 to FIG. 4.

The charging apparatus 30.1 of FIG. 1 is connected via a first pressure medium charging connection 1.1 to a first charging branch line 92ZL.1, which is connected directly to the pressure accumulator 92. The charging apparatus 30.1 comprises a first pressure medium charging line 20.1, which adjoins the first pressure medium charging connection 1.1 and leads to the compressor line 21, and therefore adjoins an inlet of the second compressor stage 31.2 of the compressor 31 via the compressor line 21. A first throttle 41, which here is nominal-width adjustable, and a first charging valve 51 are connected in the first pressure medium charging line 20.1. In the present case, the nominal-width adjustable first throttle 41 and the first charging valve 51 are shown separately in the first pressure medium charging line 20.1; they may also be arranged in the reverse order. Preferably, the first throttle 41 is integrated in the first charging valve 51, specifically in the energized open second switching state of the first charging valve 51.

Charging of the pneumatic apparatus 90.1 can take place, with operation of the two-stage compressor 31, via the main pneumatic line 60 in normal operation, in particular, in the open mode with the charging valve 51 closed and the bellows and/or accumulator valve 93, 94 open, air being aspirated via the suction line 20 and two-stage compressor activity being implemented; and also in the boost mode of a lifting process. In the boost mode of a lifting process, the first charging valve 51 opens the first charging branch line 92ZL.1 to the accumulator 92, so that the pressurized pressure medium gDM of the accumulator 92 applied to the first pressure medium charging connection 1.1, and the further pressure medium tDM made available by the first compressor stage 31.1, are conducted simultaneously and free of retaining pressure to the second compressor stage 31.2; this can be utilized in the context of a closed or partly open mode.

In the event of venting, this can be effected directly into the vent connection 3 with the vent valve 71 open and the bellows valve 93 or accumulator valve 94 open—that is, in the open mode.

While the individual control signals or current signals for the bellows valves 93 and the accumulator valve 94 are not marked in detail, activation of the first charging valve 51, of the motor M, of the first throttle 41 and of the control valve 81 may be effected via electrical control signals SL1, SM, SD1 and SE.

In the following exposition, the same reference symbols are used for identical or similar parts, or parts having identical or similar functions, for the sake of simplicity.

FIG. 2 shows a pneumatic system 100.2 comprising a pneumatic apparatus 90.2 and a compressed air supply arrangement 10.2, the valve block being implemented in the pneumatic apparatus 90.2 in the form of a first valve block 98.1 comprising the bellows valves 93 and a second charging valve 52, and a second valve block 98.2 comprising an accumulator valve 94 and an isolating valve 99. The isolating valve 99 and the second charging valve 52, like the bellows valves 93 and the accumulator valve 94, are implemented in the form of a controllable 2/2-way solenoid valve. The second charging valve 52, the motor M, a second nominal-width adjustable throttle 42 and the venting control valve 81 can be activated via electrical control signals SL2, SM, SD2 and SE. In the present case, only the differences between the compressed air supply arrangement of FIG. 2 and that of FIG. 1 are discussed, namely the different implementation of the charging apparatus 30.2.

In the present example, a second charging branch line 92ZL.2 adjoins the second charging valve 52 and the second pressure medium charging connection 1.2. In the compressed air supply arrangement 10.2, a second pressure medium charging line 20.2 adjoins the second pressure medium charging connection 1.2 and the compressor line 21. Here, only one nominal-width adjustable second throttle 42 is arranged in the second pressure medium charging line 20,2, while the second charging valve 52 is integrated in the first valve block 98.1 of the pneumatic apparatus 90.

In order to operate the pressure medium supply arrangement 10.2 of FIG. 2, a normal charging and venting process may be carried out in the open mode, as explained with reference to FIG. 1, with the isolating valve 99 open. A boost charging may be effected in the context of a lifting process with the accumulator valve 94 open and the isolating valve 99 closed, and with the second charging valve 52 open, while utilizing the pressurized pressure medium gDM applied to the second pressure medium charging connection 1.2 as well as a further pressure medium tDM made available by the first compressor stage 31.1 to the further second compressor stage 31.2. This also applies analogously to a lowering process, in which a bellows valve 93 is opened and the isolating valve 99 is closed; in this case, the pressure medium escaping from the bellows for the lowering may be used to charge the accumulator 92. That is, in contrast to a lowering process configured in an open mode, a closed lowering process may be implemented in which a bellows valve 93, as well as the accumulator valve 94 and the second charging valve 52, are opened and the compressor 31 is operated, thus providing a boost mode for a lowering operation. As a result, compressed air is transferred from the bellows 91 to the accumulator 92 via the compressor 31. This, too, is advantageously effected with the use of the pressurized pressure medium gDM of a bellows 91 acting on the second pressure medium charging connection 1.2, and of the further pressure medium tDM made available by the first compressor stage 31.1 to the second compressor stage 31.2, both flows being conducted simultaneously and free of retaining pressure.

FIG. 3 shows a simplified embodiment in comparison to FIG. 2, namely a simplified pneumatic system 100.3 comprising a compressed air supply arrangement 10.3 and a pneumatic apparatus 90.3. In this case, a 6-fold valve block 98 is formed as a single valve block comprising four bellows valves 93, an accumulator valve 94 and an isolating valve 99. Here, a first charging branch line 92ZL.1 is connected to the gallery 95 and also to the first pressure medium charging connection 1.1. In the compressed air supply arrangement 10, a first pressure medium charging line 20.1 is connected between the first pressure medium charging connection 1.1 and the compressor line 21. In the charging apparatus 30.3, a first charging valve 51 and a first fixed-nominal width throttle 43 are connected in the first pressure medium charging line 20.1, this time in the reverse sequence as compared to FIG. 1. The motor M and the first charging valve 51 are again actuatable by means of electrical control signals SM, SL1. The isolating valve 99 is actuatable via an electrical control signal ST, and the vent control valve 81 via an electrical control signal SE. With the isolating valve 99 currentlessly closed and the accumulator valve 94 open, and with the compressor 31 running, the accumulator 92 can be further charged in a lowering process with the bellows valve 93 open.

FIG. 4 shows a fully elaborated embodiment of a charging apparatus 30.4, which is connected via a first pressure medium charging connection 1.1 and a second pressure medium charging connection 1.2 to the pneumatic apparatus 90. In this case, a first charging branch line 92ZL.1 to an accumulator line 92L is connected to the first pressure medium charging connection 1.1. A second charging branch line 92ZL.2 is connected between the second pressure medium connection 1.2 and the gallery 95.1, specifically via a second charging valve 52, which is integrated in a 5-fold valve block 98.1, similar to that in the embodiment of FIG. 2. In this way, the pressure medium can be supplied to the compressor line 21 via the first pressure medium charging line 20.1 and the second pressure medium charging line 20.2, connected to the first and second pressure medium charging connections 1.1, 1.2 respectively, specifically with the first charging valve 51 open and the second charging valve 52 open. Activation of the first and second charging valves 51, 52 is effected via electrical control signals SL1, SL2. The control valve 81 is activated via an electrical signal SE. The isolating valve 99 is activated via an electrical control signal ST. The motor M of the compressor 31 is activated via an electrical control signal SM.

All the control signals may be made available by a pneumatic control module S within a vehicle control unit ECU, which also receives sensor signals p of a pressure sensor 97, a level signal N and a humidity signal h of the dryer 62. In the present case the first and second throttles 43, 44 have a fixed nominal width; both throttles 43, 44, or only the first throttle 43 or only the second throttle 44, may be integrated in the first charging valve 51 or in the second charging valve 52, even if in the present example they are shown separately in the charging apparatus 30.4.

The present embodiment allows a boost mode as a lifting process, with the first charging valve 51 open and the isolating valve 99 open and the accumulator valve 94 closed, the first and second compressor stages 31.1, 31.2 being operated. The present embodiment also allows lowering in boost mode, with the second charging valve 52 open, with the compressor 31 operating and the accumulator 92 being charged, with the accumulator valve 94 open and the isolating valves 99 closed.

Figure 5:
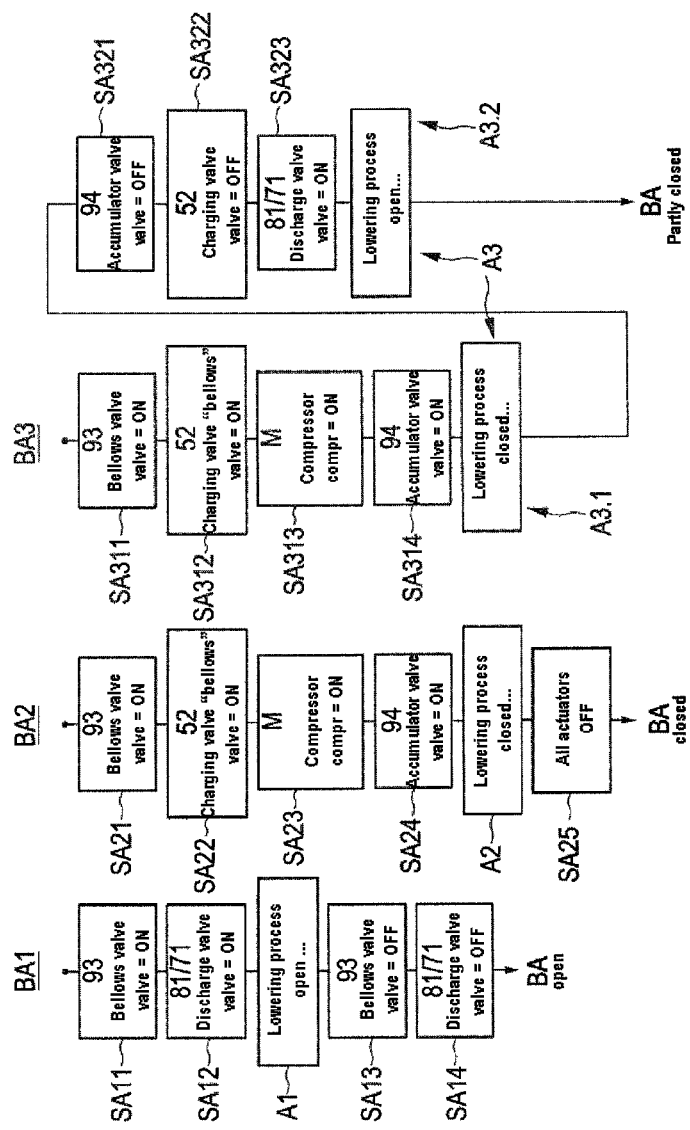
FIG. 5 is a flow chart representing an embodiment of a vehicle lowering process selectively in an open, closed or partly closed operating mode of the compressed air supply arrangement according to the present invention.
Figure 6:
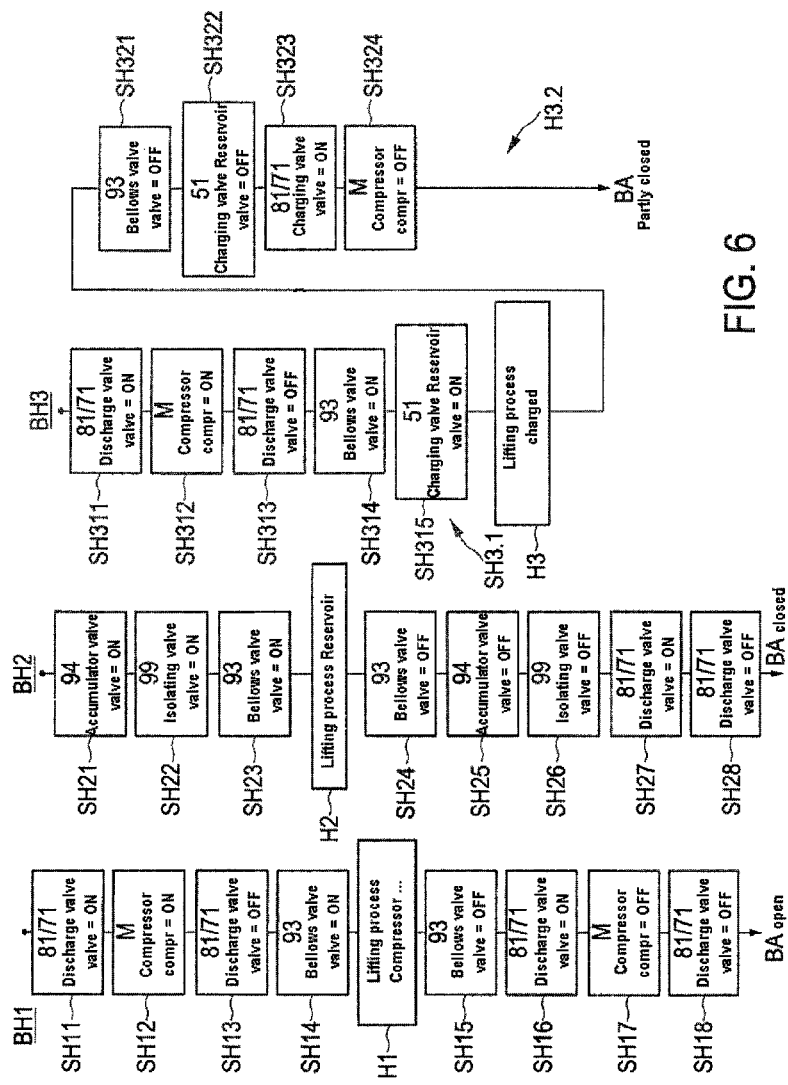
FIG. 6 is a flow chart representing a vehicle lifting process in an open, closed or partly closed operating mode.

Preferred operating modes of the pressure medium supply arrangements 10.1, 10.2, 10.3 and 10.4 are described in detail in an exemplary manner with reference to FIGS. 5 and 6. Briefly, it can be stated in principle for the open operating mode described below that compressed air is drawn only from the atmosphere and escapes thereto. For a closed operating mode it can be stated in principle that compressed air is only redistributed, without operation of the compressor. For a partly closed operating mode, it can be stated in principle that aspiration of air from the atmosphere takes place while compressed air is generated using a first compressor stage, and further compression thereof and of already pressurized compressed air takes place in the second compressor stage.

FIG. 5 is a flow diagram for three different variants BA1, BA2 and BA3 of a method for lowering a vehicle body by means of the selectively open lowering process A1, the closed lowering process A2 or the partly closed lowering process A3, and for corresponding operation of a pneumatic apparatus 90 in the form of an air suspension system, which, correspondingly, is also designed for level control. The method for the partly closed lowering A3 comprises a first step sequence A3.1 in the closed mode of the pneumatic system and a second step sequence A3.2 in the open mode, which steps are carried out sequentially and, in the present context, should be understood to mean the partly closed mode. The variants BA2 and BA3 can be executed with each of the pneumatic systems 100.2, 100.3, 100.4 described in FIGS. 2 to 4 and the variant BA1 with each of the pneumatic systems 100.1, 100.2, 100.3, 100.4 described in FIGS. 1 to 4. Regarding the description, a compressed air supply arrangement is denoted in general below for the preceding figures by 10. In addition, a pneumatic apparatus is denoted below cumulatively for the preceding figures by 90. In addition, a pneumatic system is denoted below cumulatively for the preceding figures by 100.

The lowering procedure BA1 in the open mode of the compressed air supply arrangement 10 provides in a first step SA11 for activation of a bellows valve 93, which is thereby transferred to the energized open state. The pressure medium chamber of an air spring, that is, the bellows 91, is therefore pneumatically opened to a gallery 95 or first gallery 95.1. In the case of the systems 100.4, 100.2, 100.3 of FIG. 4, FIG. 2 and FIG. 3, the isolating valve 99 is also activated and transferred to the energized open state with the second charging valve 52 closed, and the first charging valve 51 in FIG. 3 is closed. Compressed air contained in the bellows 91 can therefore escape to the pressure medium connection 2. In a second step SA12, the control valve 81 is activated by means of the control signal SE and is therefore transferred to the energized second switching state, which opens the control line 110 to the control connection 71S of the vent valve 71 and therefore transfers the vent valve 71 to the bi-directionally open second switching state. The compressed air from the bellows 93 acting on the pressure medium connection 2 can thus escape via the first regeneration throttle 64 and the unblocked non-return valve 61 to the vent line 70, the air dryer 62 being regenerated, and finally to the vent connection 3 and from there via the filter 0.3 to the environment. An open lowering process A1 then takes place. Thereafter, the bellows valve 93 is switched, in step SA13, to a currentlessly closed bellows valve 93 and, in step SA14, the vent valve 71 is transferred to a non-activated state of a closed vent valve 71 in which the non-return valve 61 is therefore not unblocked and the vent line 70 is blocked by the vent valve 71; that is, the state established with the control valve 81 is unenergized—as shown in FIGS. 1 to 4.

For the closed lowering procedure BA2 provided by the steps SA21 to SA25, the compressed air supply arrangement 10 is in the closed operating state. In this operating state, step SA21 provides for activation of a bellows valve 93, which is therefore transferred to the energized open state while compressed air is discharged from the bellows 91 to the gallery 95. Step SA22 provides for activation, for example as shown in FIG. 2 and FIG. 4, of the second charging valve 52, which is therefore transferred to the energized open state by means of the control signal SL2. In the embodiment of a compressed air supply arrangement 10 represented in FIG. 3, the first charging valve 51 is activated via the control signal SL1 and transferred to the energized open state. As a result, in step SA23 both the first and the second compressor stages 31.1, 31.2 can be activated via the control signal SM for the motor M of the compressor 31, so that the charging apparatus 30 is therefore configured to conduct the pressurized pressure medium gDM applied to the at least one pressure medium charging connection 1.2, 1.1, as well as further pressure medium 1DM made available by the first compressor stage 31.1, to the second compressor stage 31.2. The pressurized pressure medium gDM thus withdrawn from a bellows 91, together with the further pressure medium tDM from the first compressor stage 31.1, in a form compressed by the second compressor stage 31.2, can be made available to the pressure medium supply 1. From there, the whole of the pressure medium, again highly compressed, reaches the pressure medium connection 2 via the air dryer 62, the non-return valve 61 being opened in the transit direction. From the pressure medium connection 2, the pressure medium can then be made available to and stored in the pressure medium accumulator 92 via the further pressure medium line 96 and the gallery 95, or a first and/or second gallery 95.1, 95.2, the accumulator valve 94 being energized and opened in step SA24. In the closed lowering process A2, which then follows, the compressed air withdrawn from the bellows 91 does not escape to the environment but to the accumulator 92, where it can be stored for further use. Thereafter step SA25 provides for an unenergized state of all valves.

The partly closed lowering process BA3 provides for a first step sequence SA311 to SA314, which leads to the closed lowering process A3.1. Steps SA311 to SA314, which prepare for the closed lowering process A3.1 of the partly closed operating mode A3, correspond substantially to steps SA21 to SA24 as described previously. However, switching to an open lowering process A3.2 can be effected in the partly closed lowering process A3 by performing the further steps SA321 to SA323. For this purpose, in step SA321 the accumulator valve 94 is transferred to the unactuated, that is, currentlessly closed, state and then a second charging valve 52 of FIG. 2 and FIG. 4, or a first charging valve 51 of FIG. 1 and FIG. 3, is transferred to the currentlessly closed state. Then, in step SA323, the vent valve 71 can be activated, that is, the control valve 81 is transferred to the energized second switching state. This has the result that—as was explained in connection with step SA12—compressed air can now escape from the bellows 93 directly via the pressure medium connection 2 and the vent line 70 to the vent connection 3 while regeneration of the air dryer 62 takes place.

The partly closed lowering process A3 is composed, so to speak, of a directly successive sequence of a closed lowering process A3.1 comprising steps SA311 to SA314 and a directly following open lowering process A3.2 comprising steps SA321 to SA323; as a result, what is achieved in the partly closed lowering process A3 is a lowering process that can be executed at two different lowering speeds, namely a slower lowering speed in the closed lowering process A3.1 and a faster lowering speed in the open lowering process A3.2. In this way, as will become clear with reference to the drawing figures, the actual time for a lowering process A3 can be selected variably by skillful selection of the switching time between the closed lowering process A3.1 and the open lowering process A3.2. Moreover, by variable selection of the switching time between the closed lowering process A3.1 and the open lowering process A3.2 in the partly closed lowering process A3, the additional storage of the pressure medium in the pressure accumulator 92 can be adjusted variably. This can be utilized for regenerating the air dryer 62 in a process of venting to the vent connection 3, that is, to atmosphere.

FIG. 6 is a flow diagram for three different variants BH1, BH2 and BH3 of a method for lifting a vehicle body by means of selectively open, closed or partly closed operation of a pneumatic apparatus 90 in the form of an air suspension system, which correspondingly is also designed for level control. FIG. 6 shows, for selectable operating modes of a lifting process, a compressor lifting process HI, an accumulator lifting process H2 and a boosted charging lifting process H3, the latter taking place in boost mode. The compressor lifting process H1 provides in step SH11 for activation of the vent valve 71 via the control valve 81, the control valve 81 being transferred to the energized second state via the control signal SE, so that the control piston 71S of the vent valve 71 is actuated while the non-return valve 61 is unblocked, so that, at the same time, the main pneumatic line 60 and the vent line 70 are opened. Then, in step SH12, the motor M of the compressor 31 is activated via the control signal SM, that is, it is actuated to compress air aspirated via the suction line 20 using both compressor stages 31.1 and 31.2. The compressor 31 therefore runs without counterpressure and thus with low starting resistance; then, in step SH13, the vent valve 71 is transferred back to the unactuated switching state shown in FIGS. 1 to 4, the energization of the control valve 81 being terminated. In this case, therefore, the vent line 70 is closed and the compressor 31 builds up pressure in the main pneumatic line 60 while opening the non-return valve 61 in the transit direction. In this way, the pressure medium acting on the pressure medium connection 2 can be supplied to a bellows 91 of an air spring with the bellows valve 93 activated and therefore energized and open, in step SH14. This normal compressor lifting process H1 is to be preferred, provided that a pressure sensor 97 indicates that an accumulator lifting process H2 is not possible because of insufficient pressure in the accumulator 92, and/or that a boost mode according to variant BH3 is not possible because of insufficient accumulator pressure. In step SH15, a currentlessly closed bellows valve 93 is shown and in step SH16 a vent valve 71 activated via the control valve 81 is represented. The valve referred to as the switched-on discharge valve in this combination opens the main pneumatic line 60 and the vent line 70 on both sides of the air dryer 62 in the manner explained with reference to step SH11. Then, in step SH17, the motor M is switched off by means of control signal SM and then, in step SH18, the vent valve is caused, by termination of energization of the control valve 81, to close the vent line 70 and the non-return valve 61. The vent line, 70 as well as the main pneumatic line 60, are therefore switched to an unpressurized state.

For the accumulator lifting process H2 according to the closed operating variant BH2, steps SH21 to SH28 are explained below.

For the actual lifting process from accumulator 92, step SH21 provides first for activation of an accumulator valve 94, which is therefore transferred to the energized open state. Then, in step SH22, the isolating valve 99 and in step SH23 the desired bellows valve 93 are activated and are therefore transferred to the energized open state. Compressed air escaping from the accumulator 92 at a high pressure level can therefore escape via the second gallery 95.2 to the first gallery 95.1 and to a bellows line 91L and then to the bellows 91, the vehicle body being lifted in step H2. In the embodiments shown in FIG. 2, FIG. 3 and FIG. 4, compressed air escapes from the accumulator 92 via the open accumulator valve 94 and the open isolating valve 99 directly to the gallery 95. In the embodiment shown in FIG. 1, compressed air already escapes from the accumulator via the accumulator line 92L and the open accumulator valve 94 to the gallery 95. The charging valves 51, 52 are at all times unenergized, both during the compressor lifting process HI and during the accumulator lifting process H2, that is, they keep a respective charging branch line 92ZL.1 and 92ZL.2 closed. Likewise, the main pneumatic line 60 is closed in the blocking direction of the non-return valve 61 as a result of the unactuated state of the vent valve 71.

In steps SH24 to SH26, the boosted charging lifting process starts from unenergized closed states of the bellows valve 93, the accumulator valve 94 and the isolating valve 99. In step SH27, the vent valve 71 is transferred to the second switching state, the control valve 81 being activated, that is energized, by means of the control signal SE, so that the main pneumatic line 60 and the vent line 70 are transferred to the open state on both sides for the air dryer 62, for example by means of steps SH11 and SH16. This leads to venting of the main pneumatic line 60 and of the vent line 70, after which, in step SH28, the vent valve 71 returns to the first switching state shown in FIGS. 1 to 4, with the control valve 81 in the unenergized state.

The boosted lifting process H3 according to variant BH3 provides for the actual charging lifting process H3.1 and, upon conclusion thereof, venting according to H3.2, namely with steps SH311 to H315 and steps SH321 to SH324. For the actual boosted charging lifting process H3.1, step SH311 provides for activation of the vent valve 71 via the control valve 81, so that the motor of the compressor 31 can start without resistance in step SH312. The activation of the control valve is then terminated in step SH313, so that the vent valve 71 blocks the vent line 70 and the main line 60 is opened, with the compressor 31 running, by opening the non-return valve 61 in the transit direction as soon as the compressor 31 has built up a corresponding pressure. Then, in step SH314, the desired bellows valve 93 is opened by activating the energization thereof. Additionally and in parallel, in step SH315 the first charging valve 51 is opened. With the accumulator valve 94 closed, in the embodiments shown in FIG. 1 and FIG. 4, the pressure medium from the accumulator 92 is also immediately supplied to the second compressor stage, whereupon the lifting process H3 of the pneumatic apparatus 90 begins. Once this process is concluded, closing of the bellows valve 93 follows in step SH321, energization thereof being terminated, and closing of the first charging valve 51 follows in step SH322, energization likewise being terminated.

The compressed air supply arrangement is then vented in steps SH323 and SH324, the vent valve 71 being transferred via the control valve 81 to the second state which opens the vent line 70, and the motor being switched off in step SH324 via the control signal SM.

As explained with reference to FIG. 6, therefore, the selectively open, closed or partly closed operating mode of the compressed air supply arrangement 10 with normally two-stage operation of the compressor 31, makes possible a continuously two-stage charging process of the accumulator 92 in combination with a lifting process of the bellows 91, in the boosted charging lifting process H3. Also, the advantage of the selectively open, closed or partly closed operation of the compressed air supply arrangement 10 of FIGS. 1 to 4 described in an exemplary manner above and as explained with reference to FIG. 5, is achieved above all in the partly closed lowering process A3, in which it is possible variably to switch between the closed and open lowering processes A3.1 and A3.2. It should be understood that the closed and open lowering processes A3.1 and A3.2 described in an exemplary manner can be combined with one another and repeated as often as desired for a partly closed lowering process A3. The partly closed lowering process A3 is therefore expressly not limited to merely a once-only and first execution of the closed lowering process A3.1 and a merely once-only and second execution of the open lowering process A3.2. Rather, the sequence may also take place such that the open lowering process A3.2 is executed first and then the closed lowering process A3.1. A closed lowering process A3.1 may also be executed first, then an open lowering process A3.2 and finally another closed lowering process A3.1, that is, a closed lowering process A3.1 twice with an open lowering process A3.2 between them. Equally and conversely, an open lowering process A3.2 and finally an open lowering process A3.2 may be executed with a closed lowering process A3.1 between them. A sequence of four alternating different lowering processes, or more alternating different lowering processes, may also be executed in the course of a partly closed lowering process A3. This switch-over time between a closed lowering process A3.1 and an open lowering process A3.2 may take place as a function of a system state of the pneumatic system, in particular of the pneumatic apparatus and/or of the compressed air supply arrangement 10. For example, an accumulator pressure of the accumulator 92 may be taken as the predominant factor in switching from a closed lowering process to an open lowering process, for example when an upper limiting accumulator pressure is reached. Switching from an open lowering process to a closed lowering process may also take place when a lower limiting accumulator pressure is reached. A level N, in particular a level N from which lowering is to take place, may also be used, alone or in combination with an accumulator pressure, to determine a time for switching between a closed lowering process A3.1 and an open lowering process A3.2, that is, finally, the time of the transition from step SA314 to step SA321 or, conversely, from a step SA323 to a step SA312 of FIG. 5.

For a switching process from the open mode to the closed mode or inversely during a lowering process according to criteria of variant BA3, different conditions, and conditions varying according to requirement, may be specified. For example, an on-board network voltage may be so low that a compressor or a motor M of the compressor 31 cannot be cleared for use. An—especially open—lowering process is nevertheless possible. In another example, a vehicle command specifying that compressor operation cannot be cleared may be present. This may occur, for example, in the case of higher-level operation of a different consumer if the on-board network voltage is to be maintained. Here, too, an—in particular open—lowering process would nevertheless be possible.

A loading state, alone or in combination with a reservoir pressure RD—that is, pressure in the accumulator 92—may also be used to determine such a time point. A combination of reservoir pressure together with load and an actual level position from which lowering is to take place may also be used to determine a switch-over point. Additionally, the moisture charge of a dryer may be used, alone or in combination with an aforementioned parameter—accumulator pressure, current level position from which lowering is to take place, and load—in order to determine a switchover time. An accumulator 92 can be charged to a relatively high accumulator pressure in order to utilize this, so to speak, additional excess pressure to regenerate the air dryer 62, for example, should this be necessary in view of an appropriate or expected moisture charge of the air dryer 62. The charge state may be anticipated, for example, using a bellows pressure, or in another way.

To summarize, a simplified venting arrangement such as the valve arrangement 80, and simplified measurement of accumulator pressure, for example by connecting a pressure sensor 97 to the gallery 95, whereby at the same time a bellows pressure can be measured on its own or cumulatively with the other bellows via the pressure sensor 97, may be provided with a pneumatic system according to the inventive embodiments as explained in an exemplary manner with reference to the embodiments of FIGS. 1 to 4. It emerges that, because of the more sustained storage and generation of additional pressure media for the accumulator 92, a maximum accumulator pressure can in principle be reduced, since in principle the pressure medium can be generated and can be available in shorter cycle times and more flexibly, and in some cases additionally. It also emerges that the pressure medium available in the accumulator 92 no longer needs to be available for any number, or a given number, of lifting processes;

rather a pressure medium store that is enough for a single lifting process can be sufficient.

The first and/or second charging valve 51, 52 can be designed with comparatively small nominal widths in the range from not more than 0.5 mm to 1.5 mm, preferably from not more than 0.6 mm to 1.2 mm, preferably from 0.6 mm to 0.8 mm. Also, the first and/or second throttle can be designed with comparatively generous nominal widths of less than 1.8 mm, in particular less than 1.7 mm; this applies in particular to the first throttle, that is, here, the regeneration throttle 64, without impairment, firstly, of the regeneration capacity of the air dryer and without the need, secondly, for compromises in the aeration time. In particular, the configuration of the second throttle, namely, here, the vent throttle 74, may be less than 1.0 mm, in particular less than 0.8 mm, which permits a comparatively generous design of the vent valve 71 with nominal widths in the range from 1.5 mm to 2.5 mm, in particular 1.6 mm to 2.2 mm, in particular around 1.7 mm to 2.0 mm.

With this design, as explained with reference to FIG. 6, in principle, an accumulator lifting process H2 is possible and can be used to an increased extent. This leads to restricted compressor operation, as is to be preferred. In its place, a charging lifting process H3 can be carried out as required. However, a compressor lifting process HI is also in principle possible. On the other hand, it is possible, as explained with reference to FIG. 5, that in principle a closed lowering process A2 can be used, while for rapid operations a completely open lowering process A1 can also be used. A partly closed lowering process A3 is, however, preferred and can be used synergistically to maintain a pressure level in the accumulator 92 at a comparatively high level.

Although in principle a relatively slow lowering is aimed at in the closed lowering process A2 or in the partly closed lowering process A3, the accumulator pressure in the accumulator 92 can nevertheless be increased in the closed lowering process A2 with two-stage operation of the compressor 31, since the first compressor stage makes available the pressure medium, which is conducive to increasing the accumulator pressure. On the other hand, the pressure medium, which is additionally and therefore variably available in the accumulator, can be used, for example, to attain a constant lifting velocity or, if required, improved and more frequent regeneration of the air dryer 62. To summarize, the result is a preferred, reduced compressor running time since operation of the compressor 31, when used, takes place especially effectively and with a uniformly high load-exploitation rate, while additionally making it possible to store excess pressure medium in the accumulator 92. These and other advantages are especially apparent with reference to the pressure curves, illustrated in an exemplary manner in FIGS. 7 to 9B, for certain lifting-lowering sequences of the pneumatic system of FIGS. 1 to 4, independently of the embodiment.

Thus, in a first example, with a triple lifting-lowering process between levels of −35 mm to 63 mm followed by an accumulator charging process up to 18 bar for an accumulator volume of 10l, starting from a starting pressure in the accumulator of 18 bar, with a maximum accumulator pressure of 18 bar, the following results: The running time of the compressor is reduced from 194 s, in the case of operation without partly closed mode, to 96 s with partly closed mode. The lowering process takes place in approximately twice the lowering time; however, the more important absolute lifting time is halved. Nevertheless, the velocity during lifting is maintained always constant during the reduced lifting time.

In a second example based on the same parameters, that is a triple lifting-lowering sequence between −35 mm and 63 mm followed by charging of the accumulator to 18 bar with an accumulator volume of 10l, starting from a starting pressure in the accumulator of 12 bar, with a maximum accumulator pressure of 18 bar, the following improvements are obtained: The running time of the compressor is reduced from 330 s (without partly closed mode) to 214 s (with partly closed mode). Lowering takes place with approximately twice the time requirement. However the time requirement for a lifting process is halved and the lifting velocity is constant during lifting.

In a third example, in a triple lifting-lowering sequence between −35 mm and 63 mm followed by accumulator charging to 18 bar with an accumulator volume of 5l and a starting pressure in the accumulator of 18 bar, with a maximum accumulator pressure of 18 bar, the following results: The running time of the compressor 31 is reduced from 181 s without the partly closed mode to 95 s. Lowering processes require approximately twice the time expenditure whereas the time expenditure for a lifting process is reduced to half and the lifting process takes place at approximately constant velocity.

In all the examples, the lifting-lowering sequence can be repeated any number of times since the pressure medium available in the accumulator in every system state is sufficient. This leads ultimately to a reduction in accumulator installation space volume requirement to, for example, 5l; this represents a considerable advantage, given the limited installation space volume in the engine compartment or other vehicle space. In particular, the accumulator body can be designed for a higher maximum pressure despite a reduced accumulator installation space volume of, for example, 8l.

Relevant individual exemplary pressure curves are shown in FIGS. 7 to 9B.

Figure 7:
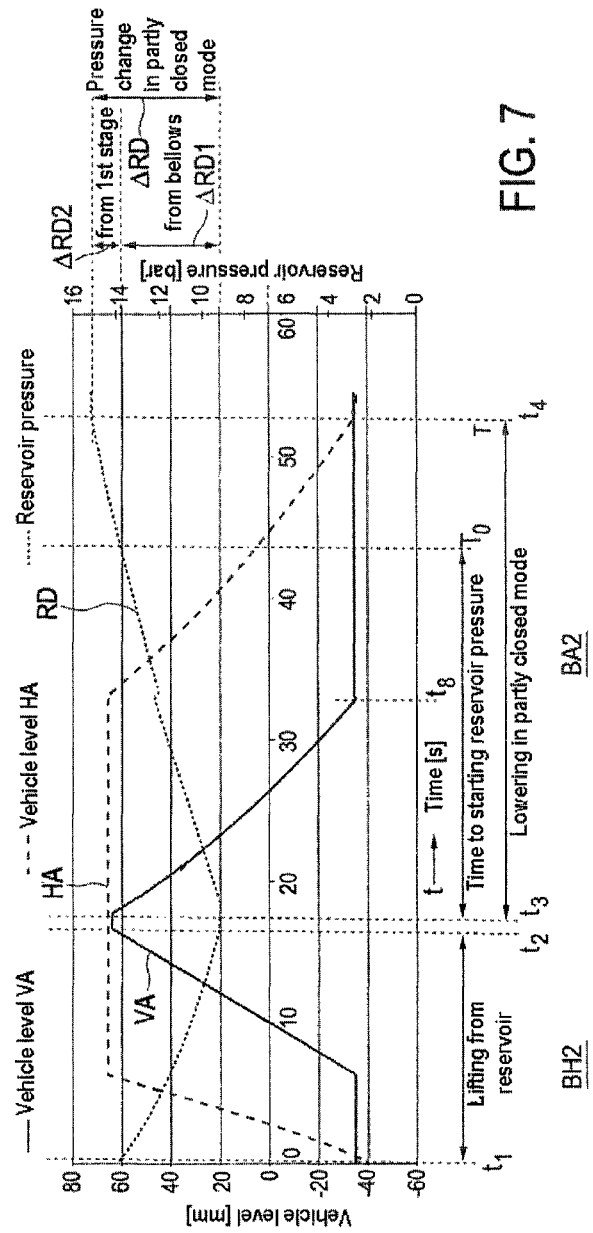
FIG. 7 is an exemplary graphical representation of a progression of an accumulator pressure, using the example of a lifting and lowering sequence in the partly closed mode of a pressure medium supply arrangement according to the present invention.

FIG. 7 shows the progression of an accumulator pressure RD (reservoir pressure) in [bar] for the progression of the level N of the front axle VA and the rear axle HA, plotted as vehicle level over time t in [s]. The lifting process taking place between t1 and t2 of the lifting-lowering sequence is an accumulator lifting process H2 as was explained with reference to FIG. 6, steps SH21 to SH28 being performed. The lowering process taking place between time t3 and t4 is a closed lowering process A2, steps SA21 to SA25 being performed; that is, substantially, pressurized pressure medium gDM applied to the at least one pressure medium charging connection 1.1, 1.2, as well as further pressure medium tDM made available by the first compressor stage 31.1, is conducted to the second compressor stage 31.2.

The reservoir pressure, denoted by RD, of the accumulator 92 falls during the accumulator lifting process H2, remains constant during the switching process between t2 and t3 and then rises between t3 and t4 during the closed lowering process A2. The slightly changed curve around time t8 marks the end of the lowering process for the front axle and the beginning of the lowering process for the rear axle HA. The time To marks the time at which the reservoir pressure HD reaches the starting pressure at time t1 or prior to the lifting process of the accumulator 92; in this case, it is slightly below 14 bar. However, because of the continuous pressure-medium compressing operation of the first compressor stage 31.1 during the entire lowering process in the course of steps SA24, SA25 and SA26 of the closed lowering process A2, the pressure gain in the accumulator 92 after time t3 can be attributed not only to a pressure $\Delta RD1$ from the bellows 91 but also to a pressure $\Delta RD2$ from the first compressor stage 31.1. The total pressure change $\Delta RD$ is therefore yielded as $\Delta RD1+\Delta RD2$, which is due to the configuration of the charging apparatus 30 for simultaneous conduction of the pressurized pressure medium gDM applied to the at least one pressure medium connection 1.1, 1.2, and of the further pressure medium tDM also made available by the first compressor stage 31.1, to the second compressor stage 31.2. The accumulator pressure ΔRD2 additionally gained in this way may be used, for example, to provide a regeneration as effective as possible of the dryer 62 during a dryer regeneration by venting the accumulator and lowering the accumulator pressure to the starting pressure at time t1 at a level of, for example, 14 bar. The additional pressure amplitude ΔRD2 may be used in the event of any leakage in order to compensate for same. Moreover, energy advantages of the closed system during a closed lowering process A2, in particular the shorter running time of the compressor 31 and of the motor M, may be exploited. In addition, the compression process is thermodynamically superior. Cold air from the bellows 91, and not only hot air from the first stage of the compressor 31.1., is compressed. In practice an intermediate cooling takes place that is thermodynamically more effective in the compression process.

Figure 8:
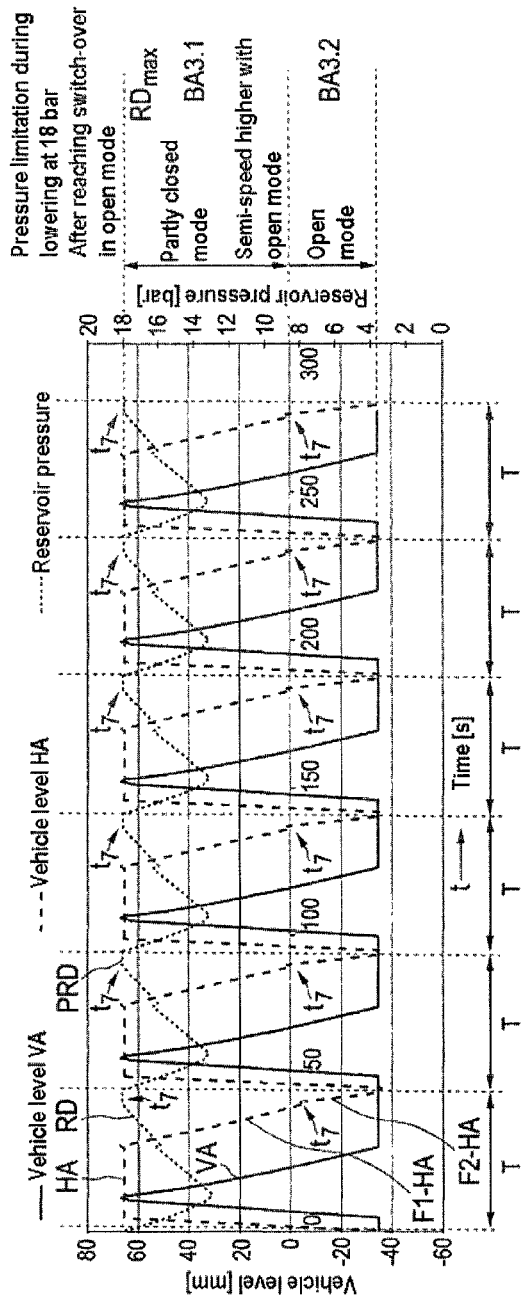
FIG. 8 is an exemplary graphical illustration of a succession of lifting and lowering sequences (modified with respect to the progression depicted in FIG. 7) according to the present invention.

FIG. 8 shows a sequence of a multiplicity of lifting-lowering sequences—as explained in principle with reference to FIG. 7. Again, the vehicle level of the front axle VA and the vehicle level of the rear axle HA are plotted as the vehicle level over time, and, in addition, the pressure of the accumulator 92 is denoted by Reservoir pressure RD. For the lifting-lowering sequences represented, carried out in each case over constant periodic times T, a partly closed lowering process A3, as explained with reference to FIG. 5, is used. The first use of the partly closed lowering process A3 takes place with a switch-over process between steps SA315 and SA321, such that a maximum pressure $RD_{max}$ of 18 bar of the accumulator 92 is not exceeded during the lowering process. A suitably chosen transition between a closed lowering process A3.1 and an open lowering process A3.2 can be observed in each case at a time t7, when the shallow flank F I-HA of the rear axle passes into a steep flank F2-HA of the rear axle HA and the reservoir pressure RD passes into a plateau P-RD. At the switch-over time t7, therefore, the lowering velocity of the rear axle HA is increased from a slow lowering velocity in the closed lowering process A3.1 to a fast lowering velocity in the open lowering process A3.2. In the open lowering process A3.2, the accumulator pressure RD passes after time t7 from a rising flank before time t7 to a plateau P-RD of largely constant accumulator pressure RD. In terms of the outcome, however, the choice of the partly closed lowering process A3 has the advantage that, in fact, a period T of a lowering-lifting sequence can always be selected as constant independently of the system conditions, if the switch-over time between a closed lowering process A3.1 and an open lowering process A3.2 is selected skillfully or is selected as a function of the system preconditions. Above all, however, it is found that the accumulator pressure of the accumulator 92 is sufficient for unlimited repeatability of the lifting-lowering sequence even when an open lowering process A3.2 is still present.

Figure 9A:
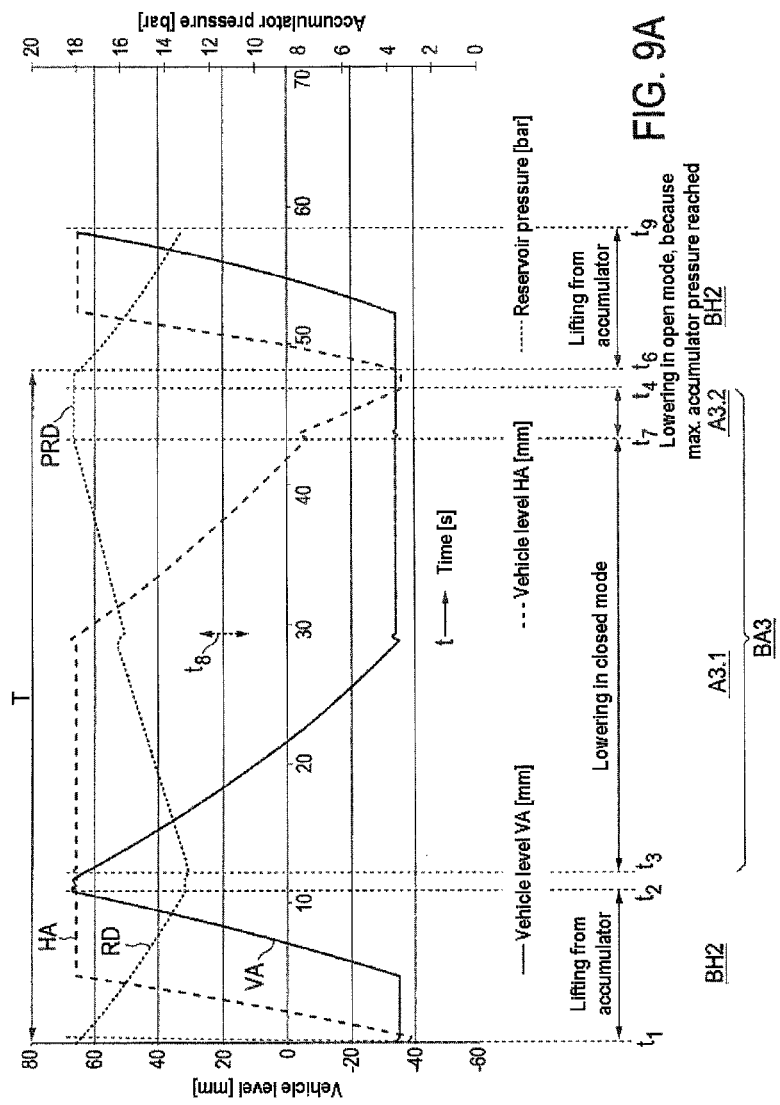
FIG. 9A is an enlarged exemplary graphical representation of an accumulator pressure for a lifting and lowering sequence in the partly closed mode depicted in FIG. 8.

FIG. 9A again shows the vehicle levels of the front axle VA and of the rear axle HA over the time axis in the context of a selectively open, closed or partly closed lowering operation for a lifting-lowering-lifting sequence. For this purpose, in the present case, in a first time interval between times t1 and t2 an accumulator lifting process H2, between times t3 and t7 a closed lowering process A3.1, and between t7 and t4 an open lowering process A3.2 is provided; that is, in total, a partly closed lowering process A3. An accumulator lift H2 then again follows between times t6 and t9. FIG. 9A therefore shows an enlarged section of a period T, as shown with reference to FIG. 8. The designations are selected as in FIG. 8, so that, in the following exposition, reference is made regarding details to the description of FIG. 8. In FIG. 9A—similar to FIG. 7—time t8 is additionally marked, which represents the time t8 of a completed lowering process for the front axle VA and a starting lowering process for the rear axle HA. Time t7 corresponds to time t7 marked in FIG. 8 and FIG. 7 for the switch-over from a closed lowering process to an open lowering process. After the period T has expired, that is, starting with time t6, the sequence of times t1 to t4 and t7 is repeated, time t6 corresponding to time t1 and time t9 to time t2.

Figure 9B:
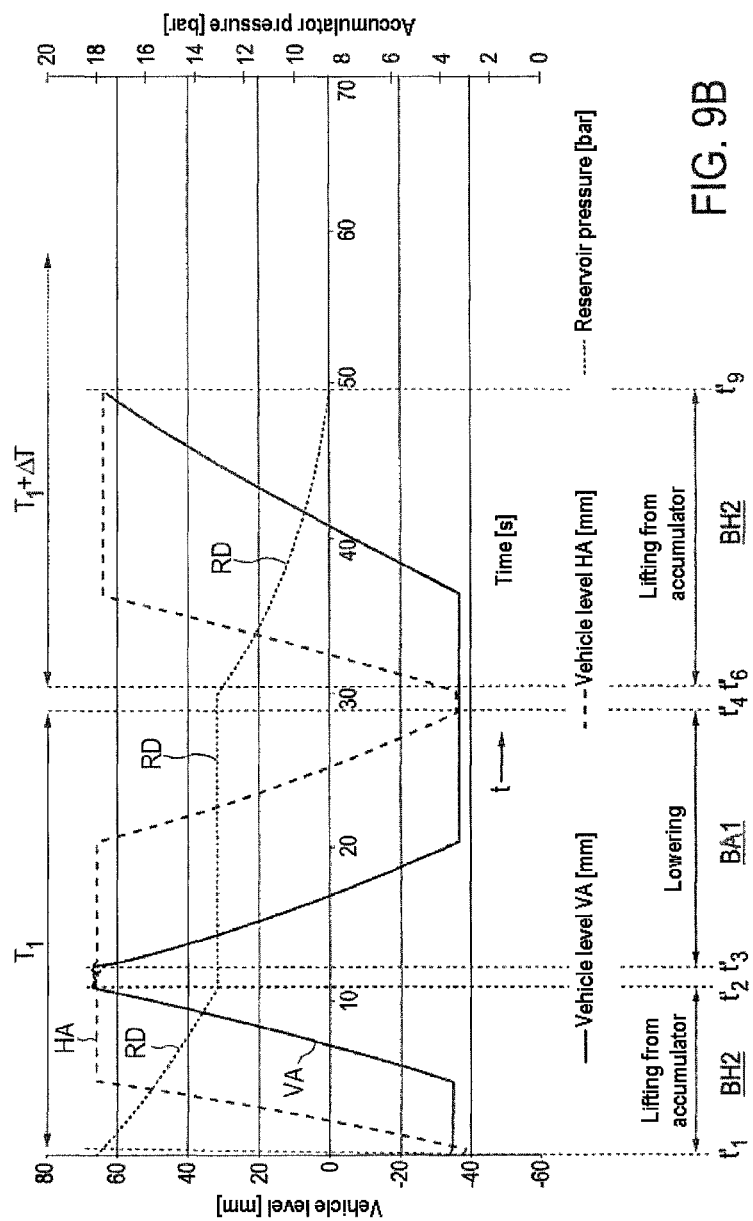
FIG. 9B shows, in comparison to FIG. 9A, an exemplary lifting-lowering sequence in open mode, an accumulator being emptied after a lifting-lowering sequence.

For comparison, FIG. 9B shows for like parameters a lifting-lowering sequence with times t1', t2', t3', t4' which correspond substantially to times t1 to t4 of FIG. 9A. In this case, however, the lifting-lowering sequence is executed without the partly closed mode A3. As a result, while the lifting can be carried out as an accumulator lifting process H2, lowering is carried out in an open lowering process A1, explained with reference to FIG. 6. During the accumulator lifting process H2, the reservoir pressure RD of the accumulator 92 falls, and during the open lowering process, A1 remains at a constant level significantly below the maximum accumulator pressure $RD_{max}$. For this reason, in a repeated sequence starting with a renewed lifting from accumulator at time 16', the reservoir pressure RD falls further, which, moreover, lasts until time t9', while the interval between t9' and t6' is nevertheless very much longer than the interval between t2' and t1'. This has two disadvantages. Firstly, the second sequence comprising T1+ΔT is significantly longer than the first sequence T1. Secondly, for a further lifting from accumulator, even when preceded by a closed lowering A2, the compressor 31 must first be operated in order to have sufficient accumulator pressure available. This has the result, firstly, that the accumulator volume, especially the accumulator installation space volume, must be designed for at least a twofold lifting process and, secondly, that in order to charge the accumulator pressure to a reference pressure the compressor must be operated in the intervals, additionally lengthening a lifting-lowering sequence. This leads, as shown by the comparison of FIG. 9A and FIG. 9B, not only to more effective utilization of the compressor running times and to a more sustained accumulator pressure, but, in addition, to a shortening of the overall times for a lifting-lowering sequence, which, moreover, is repeatable any number of times because it is extremely constant in operation.

It will thus be seen that the objects set forth above, among those made apparent from the preceding description, are efficiently attained, and since certain changes may be made in the above processes and constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A pressure medium supply arrangement for operating a pneumatic apparatus, the pressure medium supply arrangement comprising:
   a pressure medium supply;
   a charging apparatus having a multistage compressor, the charging apparatus being connected to the pressure medium supply on a pressure medium supply side, the compressor having a first and a second compressor stage;
   a pressure medium connection to a pneumatic apparatus;
   a vent connection to the environment;

at least one pressure medium charging connection to the pneumatic apparatus;

a suction line on a suction side of the compressor between a suction connection to the environment and the compressor;

a compressor line between the first and the second compressor stages;

a main pneumatic line between the pressure medium supply and the pressure medium connection;

a vent line between the pressure medium connection and the vent connection, the vent line having a vent valve; and at least one pressure medium charging line between the at least one pressure medium charging connection and the compressor line;

at least one of the charging apparatus and the compressor line being configured to substantially simultaneously conduct both (i) a pressurized pressure medium applied to the at least one pressure medium charging connection from a pressure medium storage container of the pneumatic apparatus or at least one pressure medium chamber of the pneumatic apparatus and (ii) a further pressure medium made available by the first compressor stage, to the second compressor stage.

2. The pressure medium supply arrangement of claim 1, wherein the pressure medium storage container is an accumulator.

3. The pressure medium supply arrangement of claim 1, wherein the multistage compressor is a two-stage compressor.

4. The pressure medium supply arrangement of claim 1, wherein the at least one pressure medium chamber comprises bellows.

5. The pressure medium supply arrangement as claimed in claim 1, wherein the compressor line is configured to conduct the pressurized pressure medium and the further pressure medium to the second compressor stage free of a retaining pressure.

6. The pressure medium supply arrangement as claimed in claim 1, wherein the compressor line is at least one of unblocked and unregulated.

7. The pressure medium supply arrangement as claimed in claim 1, wherein the at least one pressure medium charging line comprises at least one of (i) a first pressure medium charging line having a first throttle between a first pressure medium charging connection of the at least one pressure medium charging connection and the compressor line, and (ii) a second pressure medium charging line having a second throttle between a second pressure medium charging connection of the at least one pressure medium charging connection and the compressor line, at least one of the first throttle and the second throttle having a nominal width configured to effect a pressure drop in at least one of the first pressure medium charging line and the second pressure medium charging line with respect to the compressor line.

8. The pressure medium supply arrangement as claimed in claim 7, wherein the pressure drop has an amplitude between about one-third and one-half of a pressure in at least one of the first and the second pressure medium charging lines.

9. The pressure medium supply arrangement as claimed in claim 7, wherein the pressure drop has an amplitude ranging from about 8 to 10 bar.

10. The pressure medium supply arrangement as claimed in claim 7, wherein the pressure drop ranges from about 15 to 25 bar to about 5 to 15 bar.

11. The pressure medium supply arrangement as claimed in claim 7, wherein the pressure drop is at least one of regulated and unregulated by the nominal width of at least one of the first and the second throttle.

12. The pressure medium supply arrangement as claimed in claim 7, wherein the nominal width of at least one of the first throttle and the second throttle is about 0.5 mm to 1.5 mm.

13. The pressure medium supply arrangement as claimed in claim 7, wherein the nominal width of at least one of the first throttle and the second throttle is about 0.6 mm to 1.2 mm.

14. The pressure medium supply arrangement as claimed in claim 7, wherein the nominal width of at least one of the first throttle and the second throttle is about 0.6 mm to 0.8 mm.

15. The pressure medium supply arrangement as claimed in claim 7, wherein at least one of the first and the second throttle has one of a fixed nominal width and an adjustable nominal width.

16. The pressure medium supply arrangement as claimed in claim 1, further comprising at least one of (i) a first charging valve connectable to a first pressure medium charging connection of the at least one pressure medium charging connection and (ii) a second charging valve connectable to a second pressure medium charging connection of the at least one pressure medium charging connection.

17. The pressure medium supply arrangement as claimed in claim 16, wherein the charging apparatus is configured to substantially simultaneously conduct the pressurized pressure medium and the further pressure medium independently of a switching state of at least one of the first charging valve and the second charging valve.

18. The pressure medium supply arrangement as claimed in claim 17, wherein the compressor line is configured to substantially simultaneously conduct the pressurized pressure medium and the further pressure medium independently of a switching state of at least one of the first charging valve and the second charging valve.

19. A pneumatic system, comprising a pressure medium supply arrangement as claimed in claim 1, and a pneumatic apparatus.

20. The pneumatic system as claimed in claim 19, wherein the pneumatic apparatus is a pressure medium vehicle suspension system including a pressure medium storage container and at least one pressure medium chamber.

21. The pneumatic system as claimed in claim 20, wherein the pressure medium storage container is an accumulator and the at least one pressure medium chamber includes bellows.

22. The pneumatic system as claimed in claim 20, wherein the pressure medium storage container has an installation space volume of less than about twelve liters.

23. The pneumatic system as claimed in claim 20, wherein the pressure medium storage container has an installation space volume from about four to about twelve liters.

24. The pneumatic system as claimed in claim 20, wherein the pressure medium storage container has an installation space volume from about four to about six liters.

25. The pneumatic system as claimed in claim 20, wherein the pressure medium storage container is connected to a gallery via an accumulator line, and at least one charging branch line branches from at least one of: an accumulator, a pneumatic line to the gallery, a gallery, and an accumulator line.

26. The pneumatic system as claimed in claim 20, further comprising at least one of (i) first directional control valves combined in a first valve block, and (ii) second directional control valves combined in a second valve block.

27. The pneumatic system as claimed in claim 26, wherein the first directional control valves include a bellows valve and a charging valve.

28. The pneumatic system as claimed in claim 26, wherein the first valve block is one of a 5-fold block and a 6-fold block.

29. The pneumatic system as claimed in claim 26, wherein the second valve block is a 2-fold block.

30. A method for operating the pressure medium supply arrangement as claimed in claim 1, the method comprising substantially simultaneously conducting in a conduction direction both the pressurized pressure medium applied to the pressure medium charging connection and the further pressure medium made available by the first compressor stage of the compressor, to the second compressor stage of the compressor.

31. The method as claimed in claim 30, wherein the pressurized pressure medium and the further pressure medium are conducted free of a retaining pressure acting against the conduction direction.

32. The method as claimed in claim 31, wherein the pressurized pressure medium and the further pressure medium are conducted one of simultaneously and successively via at least one of the at least one pressure medium charging line and the compressor line.

33. The method as claimed in claim 30, wherein the pressurized pressure medium is supplied from the pressure medium charging connection to the second compressor stage, and wherein the pressurized pressure medium is supplied, further compressed, via the main pneumatic line between the pressure medium supply and the pressure medium connection, to the pneumatic apparatus.

34. The method as claimed in claim 30, wherein the further pressure medium is made available from the suction connection via the first compressor stage, and is supplied to the second compressor stage, and wherein the further pressure medium is supplied, further compressed, via the main pneumatic line between the pressure medium supply and the pressure medium connection, to the pneumatic apparatus.

35. The method as claimed in claim 30, wherein the further pressure medium is made available from the suction connection via the suction line and the compressor line.

36. The method as claimed in claim 30, further comprising effecting a vehicle lowering process implementable by the pneumatic apparatus by operating the pressure medium supply arrangement one of (i) selectively open, (ii) closed and (iii) partly closed.

37. The method as claimed in claim 36, wherein the pressure medium supply arrangement is operated selectively open while discharging the pressure medium from the at least one pressure medium chamber to the vent connection.

38. The method as claimed in claim 36, wherein the pressure medium supply arrangement is operated closed while discharging the pressure medium from the at least one pressure medium chamber to the pressure medium storage container via the compressor while the pressurized pressure medium applied to the pressure medium charging connection and the further pressure medium made available by the first compressor stage are conducted in the conduction direction to the second compressor stage.

39. The method as claimed in claim 36, wherein the pressure medium supply arrangement is operated partly closed while discharging the pressure medium from the at least one pressure medium chamber to the vent connection and from the pressure medium chamber to the pressure medium storage container one of successively and at least intermittently simultaneously.

40. The method as claimed in claim 30, further comprising effecting a vehicle lifting process implementable by the pneumatic apparatus by operating the pressure medium supply arrangement one of (iv) selectively open, (v) closed and (vi) partly closed.

41. The method as claimed in claim 40, wherein the pressure medium supply arrangement is operated selectively open only while the pressure medium is conveyed to the pressure medium connection via the compressor.

42. The method as claimed in claim 40, wherein the pressure medium supply arrangement is operated closed while the pressure medium is discharged from the pressure medium storage container to the at least one pressure medium chamber via a gallery.

43. The method as claimed in claim 40, wherein the pressure medium supply arrangement is operated partly closed while the pressurized pressure medium applied to the pressure medium charging connection and the further pressure medium made available by the first compressor stage are conducted in the conduction direction to the second compressor stage one of successively and at least intermittently simultaneously.

44. The method as claimed in claim 30, further comprising effecting one of a partly closed lifting process and a partly closed lowering process during which a venting process to the vent connection is effected with regeneration of a dryer in the main pneumatic line.

45. The method as claimed in claim 44, wherein, during regeneration of the dryer, a pressure volume in the pneumatic apparatus is reduced to a reference pressure volume, and at least a part of the pressure volume is additionally conveyed by the first compressor stage during one of the partly closed lifting process and the partly closed lowering process and is used for the regeneration of the dryer.

46. A pneumatic system, comprising a pressure medium vehicle suspension system and a pressure medium supply arrangement for operating the suspension system, the suspension system including a pressure medium storage container and at least one pressure medium chamber, the pressure medium supply arrangement comprising:
  a pressure medium supply;
  a charging apparatus having a multistage compressor, the charging apparatus being connected to the pressure medium supply on a pressure medium supply side, the compressor having a first and a second compressor stage;
  a pressure medium connection to the suspension system;
  a vent connection to the environment;
  at least one pressure medium charging connection to the suspension system;
  a suction line on a suction side of the compressor between a suction connection to the environment and the compressor;
  a compressor line between the first and the second compressor stages;
  a main pneumatic line between the pressure medium supply and the pressure medium connection;
  a vent line between the pressure medium connection and the vent connection, the vent line having a vent valve;
  at least one pressure medium charging line between the at least one pressure medium charging connection and the compressor line; and
  at least one of (i) first directional control valves combined in a first valve block and (ii) second directional control valves combined in a second valve block, the second directional control valves including at least one of an accumulator valve and an isolating valve;

at least one of the charging apparatus and the compressor line being configured to substantially simultaneously conduct both a pressurized pressure medium applied to the at least one pressure medium charging connection and a further pressure medium made available by the first compressor stage, to the second compressor stage.

* * * * *